US012185445B2

(12) United States Patent
Raneri

(10) Patent No.: US 12,185,445 B2
(45) **Date of Patent: *Dec. 31, 2024**

(54) MULTIPLE LOCATION LOAD CONTROL SYSTEM

(71) Applicant: Lutron Technology Company LLC, Coopersburg, PA (US)

(72) Inventor: Daniel C. Raneri, Orefield, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/346,964

(22) Filed: Jul. 5, 2023

(65) Prior Publication Data

US 2023/0371157 A1 Nov. 16, 2023

Related U.S. Application Data

(63) Continuation of application No. 17/855,883, filed on Jul. 1, 2022, now Pat. No. 11,743,997, which is a continuation of application No. 17/026,429, filed on Sep. 21, 2020, now Pat. No. 11,382,204, which is a continuation of application No. 16/805,907, filed on Mar. 2, 2020, now Pat. No. 10,785,857, which is a continuation of application No. 16/205,666, filed on Nov. 30, 2018, now Pat. No. 10,624,178.

(60) Provisional application No. 62/592,585, filed on Nov. 30, 2017.

(51) Int. Cl.

*H05B 47/185* (2020.01)
*H05B 47/19* (2020.01)
*H05B 45/315* (2020.01)
*H05B 47/195* (2020.01)

(52) U.S. Cl.

CPC .......... *H05B 47/185* (2020.01); *H05B 47/19* (2020.01); *H05B 45/315* (2020.01); *H05B 47/195* (2020.01)

(58) Field of Classification Search

CPC .... H05B 47/185; H05B 47/19; H05B 45/315; H05B 47/195

See application file for complete search history.

(56) References Cited

U.S. PATENT DOCUMENTS 5,248,919 A 9/1993 Hanna et al.
5,798,581 A 8/1998 Keagy et al.
5,848,054 A 12/1998 Mosebrook et al.

(Continued)

*Primary Examiner* — Minh D A

(74) *Attorney, Agent, or Firm* — Philip N. Smith; Glen R. Farbanish; Michael S. Czarnecki

(57) ABSTRACT

A multiple location dimming system may include a smart dimmer (e.g., a main load control device) and one or more remote dimmers (e.g., accessory devices) for controlling the amount of power delivered to a lighting load. The multiple location dimming system may be installed in place of a multiple location switch system (e.g., having three, four, or more multi-way switches), and may not require a neutral connection at any of the control devices of the multiple location dimming system. The main load control device and the accessory devices of the multiple location dimming system may be configured to display a present intensity level of a lighting load on one or more visual indicators. The accessory devices may have the same or different user interfaces as the main load control device, and may provide additional functionality over that which the main load control device offers.

19 Claims, 16 Drawing Sheets

(56) References Cited

U.S. PATENT DOCUMENTS

| | | | | |
|---|---|---|---|---|
| 6,803,728 | B2 | 10/2004 | Balasubramaniam et al. | |
| 7,872,429 | B2 | 1/2011 | Steiner et al. | |
| 9,084,310 | B2 | 7/2015 | Bedell et al. | |
| 9,686,842 | B1 * | 6/2017 | Coombes | H05B 45/20 |
| 10,624,178 | B2 * | 4/2020 | Raneri | H05B 47/185 |
| 10,785,857 | B2 * | 9/2020 | Raneri | H05B 47/19 |
| 11,382,204 | B2 * | 7/2022 | Raneri | H05B 47/185 |
| 11,743,997 | B2 * | 8/2023 | Raneri | H05B 47/19 315/294 |
| 2002/0154652 | A1 | 10/2002 | Yoshimura et al. | |
| 2006/0125426 | A1 | 6/2006 | Veskovic et al. | |
| 2008/0136261 | A1 | 6/2008 | Mierta | |
| 2012/0056712 | A1 | 3/2012 | Knode | |
| 2013/0181630 | A1 | 7/2013 | Taipale et al. | |
| 2015/0237700 | A1 | 8/2015 | Woytowitz | |
| 2015/0349567 | A1 | 12/2015 | Weightman et al. | |
| 2016/0353547 | A1 | 12/2016 | Shivell et al. | |
| 2017/0024020 | A1 * | 1/2017 | Kirkpatrick | G06F 3/0238 |
| 2017/0118811 | A1 | 4/2017 | Dadashnialehi et al. | |
| 2017/0228110 | A1 * | 8/2017 | Arora | G05B 15/02 |
| 2017/0238392 | A1 | 8/2017 | Shearer et al. | |
| 2019/0166678 | A1 | 5/2019 | Raneri | |

* cited by examiner

MULTIPLE LOCATION LOAD CONTROL SYSTEM

CROSS-REFERENCE TO RELATED APPLICATIONS

This application is a continuation of U.S. patent application Ser. No. 17/855,883, filed on Jul. 1, 2022, now U.S. Pat. No. 11,743,997, issued Aug. 29, 2023, which is a continuation of U.S. patent application Ser. No. 17/026,429, filed on Sep. 21, 2020, now U.S. Pat. No. 11,382,204, issued on Jul. 5, 2022, which is a continuation of U.S. patent application Ser. No. 16/805,907, filed on Mar. 2, 2020, now U.S. Pat. No. 10,785,857, issued on Sep. 22, 2020, which is a continuation of U.S. patent application Ser. No. 16/205,666, filed Nov. 30, 2018, now U.S. Pat. No. 10,624,178, issued on Apr. 14, 2020, which claims the benefit of U.S. Provisional Patent Application No. 62/592,585, filed Nov. 30, 2017, the entire disclosures of which are hereby incorporated by reference.

BACKGROUND

Three-way and four-way switch systems for use in controlling electrical loads, such as lighting loads, are known in the art. Typically, the switches are coupled together in series electrical connection between an alternating-current (AC) power source and the lighting load. The switches are subjected to an AC source voltage and carry full load current between the AC power source and the lighting load, as opposed to low-voltage switch systems that operate at low voltage and low current, and communicate digital commands (usually low-voltage logic levels) to a remote controller that controls the level of AC power delivered to the load in response to the commands. Thus, as used herein, the terms “three-way switch”, “three-way system”, “four-way switch”, and “four-way system” mean such switches and systems that are subjected to the AC source voltage and carry the full load current.

A three-way switch derives its name from the fact that it has three terminals and is more commonly known as a single-pole double-throw (SPDT) switch, but will be referred to herein as a “three-way switch”. Note that in some countries a three-way switch as described above is known as a “two-way switch”.

A four-way switch is a double-pole double-throw (DPDT) switch that is wired internally for polarity-reversal applications. A four-way switch is commonly called an intermediate switch, but will be referred to herein as a “four-way switch”.

In a typical, prior art three-way switch system, two three-way switches control a single lighting load, and each switch is fully operable to independently control the load, irrespective of the status of the other switch. In such a three-way switch system, one three-way switch must be wired at the AC power source side of the system (sometimes called “line side”), and the other three-way switch must be wired at the lighting load side of the system.

FIG. 1A shows a standard three-way switch system 100, which includes two three-way switches 102, 104. The switches 102, 104 are connected between an AC power source 106 and a lighting load 108. The three-way switches 102, 104 each include “movable” (or common) contacts, which are electrically connected to the AC power source 106 and the lighting load 108, respectively. The three-way switches 102, 104 also each include two fixed contacts. When the movable contacts are making contact with the upper fixed contacts, the three-way switches 102, 104 are in position A in FIG. 1A. When the movable contacts are making contact with the lower fixed contact, the three-way switches 102, 104 are in position B. When the three-way switches 102, 104 are both in position A (or both in position B), the circuit of system 100 is complete and the lighting load 108 is energized. When switch 102 is in position A and switch 104 is in position B (or vice versa), the circuit is not complete and the lighting load 108 is not energized.

Three-way dimmer switches that replace three-way switches are known in the art. An example of a three-way dimmer switch system 150, including one prior art three-way dimmer switch 152 and one three-way switch 104 is shown in FIG. 1B. The three-way dimmer switch 152 includes a dimmer circuit 152A and a three-way switch 152B. A typical, AC phase control dimmer circuit 152A regulates the amount of energy supplied to the lighting load 108 by conducting for some portion of each half cycle of the AC waveform, and not conducting for the remainder of the half cycle. Because the dimmer circuit 152A is in series with the lighting load 108, the longer the dimmer circuit conducts, the more energy will be delivered to the lighting load 108. Where the lighting load 108 is a lamp, the more energy that is delivered to the lighting load 108, the greater the light intensity level of the lamp. In a typical dimming operation, a user may adjust a control to set the light intensity level of the lamp to a desired light intensity level. The portion of each half cycle for which the dimmer conducts is based on the selected light intensity level. The user is able to dim and toggle the lighting load 108 from the three-way dimmer switch 152 and is only able to toggle the lighting load from the three-way switch 104. Since two dimmer circuits cannot be wired in series, the three-way dimmer switch system 150 can only include one three-way dimmer switch 152, which can be located on either the line side or the load side of the system.

A four-way switch system is required when there are more than two switch locations from which to control the load. For example, a four-way system requires two three-way switches and one four-way switch, wired in well known fashion, so as to render each switch fully operable to independently control the load irrespective of the status of any other switches in the system. In the four-way system, the four-way switch is required to be wired between the two three-way switches in order for all switches to operate independently, e.g., one three-way switch must be wired at the AC source side of the system, the other three-way switch must be wired at the load side of the system, and the four-way switch must be electrically situated between the two three-way switches.

FIG. 1C shows a prior art four-way switching system 180. The system 180 includes two three-way switches 102, 104 and a four-way switch 185. The four-way switch 185 has two states. In the first state, node A1 is connected to node A2 and node B1 is connected to node B2. When the four-way switch 185 is toggled, the switch changes to the second state in which the paths are now crossed (e.g., node A1 is connected to node B2 and node B1 is connected to node A2). Note that a four-way switch can function as a three-way switch if one terminal is simply not connected.

FIG. 1D shows another prior art switching system 190 containing a plurality of four-way switches 185. As shown, any number of four-way switches can be included between the three-way switches 102, 104 to enable multiple location control of the lighting load 108.

Multiple location dimming systems employing a smart dimmer and one or more specially-designed remote (or “accessory”) dimmers have been developed. The remote dimmers permit the intensity level of the lighting load to be adjusted from multiple locations. A smart dimmer is one that includes a microcontroller or other processing means for providing an advanced set of control features and feedback options to the end user. For example, the advanced features of a smart dimmer may include a protected or locked lighting preset, fading, and double-tap to full intensity. The microcontroller controls the operation of the semiconductor switch to thus control the intensity of the lighting load.

To power the microcontroller, the smart dimmers include power supplies, which draw a small amount of current through the lighting load when the semiconductor switch is non-conductive each half cycle. The power supply typically uses this small amount of current to charge a storage capacitor and develop a direct-current (DC) voltage to power the microcontroller. An example of a multiple location lighting control system, including a wall-mountable smart dimmer switch and wall-mountable remote switches for wiring at all locations of a multiple location dimming system, is disclosed in commonly assigned U.S. Pat. No. 5,248,919, issued on Sep. 28, 1993, entitled LIGHTING CONTROL DEVICE, which is herein incorporated by reference in its entirety.

Referring again to the system 150 of FIG. 1B, since no load current flows through the dimmer circuit 152A of the three-way dimmer switch 152 when the circuit between the AC power source 106 and the lighting load 108 is broken by either three-way switch 152B or 104, the dimmer switch 152 is not able to include a power supply and a microcontroller. Thus, the dimmer switch 152 is not able to provide the advanced set of features of a smart dimmer to the end user.

FIG. 2 shows an example multiple location lighting control system 200 including one wall-mountable smart dimmer 202 and one wall-mountable remote dimmer 204. The dimmer 202 has a hot (H) terminal for receipt of an AC source voltage provided by an AC power source 206, and a dimmed-hot (DH) terminal for providing a dimmed-hot (or phase controlled) voltage to a lighting load 208. The remote dimmer 204 is connected in series with the DH terminal of the dimmer 202 and the lighting load 208, and comprises two terminals DH1, DH2. The terminals DH1, DH2 are electrically coupled together to allow the remote dimmer 204 to pass the dimmed-hot voltage through to the lighting load 208.

The dimmer 202 and the remote dimmer 204 both have actuators to allow for raising, lowering, and toggling on/off the light intensity level of the lighting load 208. The dimmer 202 is responsive to actuation of any of these actuators to alter the intensity level or to power the lighting load 208 on/off accordingly. In particular, an actuation of an actuator at the remote dimmer 204 causes an AC control signal, or partially rectified AC control signal, to be communicated from that remote dimmer 204 to the dimmer 202 over the wiring between an accessory dimmer terminal AD of the remote dimmer 204 and an accessory dimmer terminal AD of the dimmer 202. The dimmer 202 is responsive to receipt of the control signal to alter the dimming level or toggle the load 208 on/off. Thus, the load can be fully controlled from the remote dimmer 204.

The user interface of the dimmer 202 of the multiple location lighting control system 200 is shown in FIG. 3. As shown, the dimmer 202 may include a faceplate 310, a bezel 312, an intensity selection actuator 314 for selecting a desired level of light intensity of a lighting load 208 controlled by the dimmer 202, and a control switch actuator 316. An actuation of the upper portion 314A of the actuator 314 increases or raises the light intensity of the lighting load 208, while an actuation of the lower portion 314B of the actuator 314 decreases or lowers the light intensity.

The dimmer 202 may also include a visual display in the form of a plurality of light sources 318, such as light-emitting diodes (LEDs). The light sources 318 may be arranged in an array (such as a linear array as shown), and are illuminated to represent a range of light intensity levels of the lighting load 208 being controlled. The intensity levels of the lighting load 208 may range from a minimum intensity level, which may be the lowest visible intensity, but which may be "full off", or 0%, to a maximum intensity level, which is typically "full on", or substantially 100%. Light intensity level is typically expressed as a percent of full intensity. Thus, when the lighting load 208 is on, light intensity level may range from 1% to substantially 100%.

FIG. 4 is a simplified block diagram of the dimmer 202 and the remote dimmer 204 of the multiple location lighting control system 200. The dimmer 202 includes a bidirectional semiconductor switch 420, e.g., a triac or two field-effect transistors (FETs) in anti-series connection, coupled between the hot terminal H and the dimmed-hot terminal DH, to control the current through, and thus the light intensity of, the lighting load 208. The semiconductor switch 420 has a control input (or gate), which is connected to a gate drive circuit 424. The input to the gate renders the semiconductor switch 420 conductive or non-conductive, which in turn controls the power supplied to the lighting load 208. The gate drive circuit 424 provides control inputs to the semiconductor switch 420 in response to command signals from a microcontroller 426.

The microcontroller 426 receives inputs from a zero-crossing detector 430 and a signal detector 432 and controls the semiconductor switch 420 accordingly. The microcontroller 426 also generates command signals to a plurality of light-emitting diodes (LEDs) 418 for providing feedback to the user of the dimmer 202. A power supply 428 generates a DC output voltage $V_{CC}$ to power the microcontroller 426. The power supply is coupled between the hot terminal H and the dimmed hot terminal DH.

The zero-crossing detector 430 determines the zero-crossings of the input AC supply voltage from the AC power supply 206. A zero-crossing is defined as the time at which the AC supply voltage transitions from positive to negative polarity (e.g., a negative-going zero-crossing), or from negative to positive polarity (e.g., a positive-going zero-crossing), at the beginning of each half cycle. The zero-crossing information is provided as an input to microcontroller 426. The microcontroller 426 provides the gate control signals to operate the semiconductor switch 420 to provide voltage from the AC power source 206 to the lighting load 208 at predetermined times relative to the zero-crossing points of the AC waveform.

Generally, two techniques are used for controlling the power supplied to the lighting load 208: forward phase control dimming and reverse phase control dimming. In forward phase control dimming, the semiconductor switch 420 is turned on at some point (e.g., a firing angle or a transition time) within each AC line voltage half cycle and remains on until the next voltage zero-crossing. Forward phase control dimming is often used to control energy to a resistive or inductive load, which may include, for example, a magnetic low-voltage transformer or an incandescent lamp. In reverse phase control dimming, the semiconductor switch 420 is turned on at the zero-crossing of the AC line voltage and turned off at some point (e.g., a firing angle or a transition time) within each half cycle of the AC line voltage. Reverse phase control is often used to control energy to a capacitive load, which may include, for example, an electronic low-voltage transformer. Since the semiconductor switch 420 must be conductive at the beginning of the half cycle, and be able to be turned off with in the half cycle, reverse phase control dimming requires that the dimmer have two FETs in anti-serial connection, or the like.

The signal detector 432 has an input 440 for receiving switch closure signals from momentary switches T, R, and L. Switch T corresponds to a toggle switch controlled by the switch actuator 316, and switches R and L correspond to the raise and lower switches controlled by the upper portion 314A and the lower portion 314B, respectively, of the intensity selection actuator 314.

Closure of switch T connects the input of the signal detector 432 to the DH terminal of the dimmer 202, and allows both positive and negative half cycles of the AC current to flow through the signal detector. Closure of switches R and L also connects the input of the signal detector 432 to the DH terminal. However, when switch R is closed, current only flows through the signal detector 432 during the positive half cycles of the AC power source 406 because of a diode 434. In similar manner, when switch L is closed, current only flows through the signal detector 432 during the negative half cycles because of a diode 436. The signal detector 432 detects when the switches T, R, and L are closed, and provides two separate output signals representative of the state of the switches as inputs to the microcontroller 426. A signal on the first output of the signal detector 432 indicates a closure of switch R and a signal on the second output indicates a closure of switch L. Simultaneous signals on both outputs represents a closure of switch T. The microprocessor controller 426 determines the duration of closure in response to inputs from the signal detector 432.

The remote dimmer 204 provides a means for controlling the dimmer 202 from a remote location in a separate wall box. The remote dimmer 204 includes a further set of momentary switches T', R', and L' and diodes 434' and 436'. The wire connection is made between the accessory dimmer terminal of the remote dimmer 204 and the accessory dimmer terminal AD of the dimmer 202 to allow for the communication of actuator presses at the remote switch. The accessory dimmer terminal AD is connected to the input 440 of the signal detector 432. The action of switches T', R', and L' in the remote dimmer 204 corresponds to the action of switches T, R, and L in the dimmer 202. Since the remote dimmer 204 does not have LEDs, no feedback can be provided to a user at the remote dimmer 204.

SUMMARY

The present disclosure relates to multiple location load control systems having multiple smart load control devices, and more particularly, a multiple location dimming system that includes a smart dimmer (e.g., a main load control device) and one or more remote dimmers (e.g., accessory devices) for controlling the amount of power delivered to a lighting load. The multiple location dimming system may be installed in place of a multiple location switch system (e.g., having three, four, or more multi-way switches), and may not require a neutral connection at any of the control devices of the multiple location dimming system. The main load control device and the accessory devices of the multiple location dimming system may be configured to display a present intensity level of a lighting load on one or more visual indicators. The accessory devices may have the same or different user interfaces as the main load control device, and may provide additional functionality over that which the main load control device offers.

As described herein, a load control system for controlling power delivered from an AC power source to a plurality of electrical loads including a first electrical load and a second electrical load may comprise first and second load control devices and an accessory device. The first load control device may comprise a first main terminal, a second main terminal, and an accessory terminal. The first load control device may be adapted to be electrically coupled in series between the AC power source and the first electrical load for control of the power delivered to the first electrical load. The first load control device may be configured to conduct a load current from the AC power source to the first electrical load via the first and second main terminals. The accessory device may be adapted to be coupled between the first main terminal and the accessory terminal of the first load control device or between the second main terminal and the accessory terminal of the first load control device. The accessory device may be adapted to be coupled to the accessory terminal of the first load control device via an accessory wiring. The second load control device may be adapted to be electrically coupled in series between the AC power source and the second electrical load for control of the power delivered to the second electrical load. The accessory device may be configured to transmit a first digital message including a command for controlling the first electrical load to the first load control device via the accessory wiring. The accessory device may be configured to transmit a second digital message including a command for controlling the second electrical load.

A main load control device for use in a load control system for controlling power delivered from an AC power source to plurality of electrical loads is also described herein. The load control system may include an accessory device adapted to be coupled to the main load control device via an electrical wire and a second load control device adapted to control the power delivered to a second electrical load. The main load control device may comprise a controllably conductive device, a control circuit, and first and second communication circuits. The controllably conductive device may be adapted to be electrically coupled in series between the AC power source and the first electrical load. The control circuit may be configured to control the controllably conductive device to control the power delivered to a first electrical load. The first communication circuit may be adapted to be coupled to the electrical wire and may be configured to transmit digital messages to and receive digital messages from the accessory device via the electrical wire. The second communication circuit may be adapted to wirelessly transmit digital messages to and receive digital messages from the second load control device. The control circuit may be configured to receive a first digital message including a command for controlling the first electrical load from the accessory device via the first communication circuit. The control circuit may be further configured to receive a second digital message including a command for controlling the second electrical load from the accessory device via the first communication circuit, and to subsequently transmit a third digital message including the command for controlling the second electrical load to the second load control device via the second communication circuit.

An accessory device for use in a load control system for controlling power delivered from an AC power source to plurality of electrical loads may comprise a first communication circuit, a control circuit, and a power supply. The load control system may include a main load control device adapted to control the power delivered to a first electrical load and a second load control device adapted to control the power delivered to a second electrical load. The main load control device may be adapted to be coupled to the accessory device via an electrical wire. The first communication circuit may be adapted to be coupled to the electrical wire, and may be configured to transmit digital messages to and receive digital messages from the main load control device via the electrical wire. The control circuit may be coupled to the first communication circuit for transmitting and receiving digital messages via the electrical wire. The power supply may be configured to generate a supply voltage for powering the control circuit and the first communication circuit, and to conduct a charging current from the main load control device through the electrical wire. The control circuit may be configured to transmit a first digital message including a command for controlling the first electrical load to the main load control device via the first communication circuit. The control circuit may be further configured to transmit a second digital message including a command for controlling the second electrical load.

DETAILED DESCRIPTION

Figure 1A:
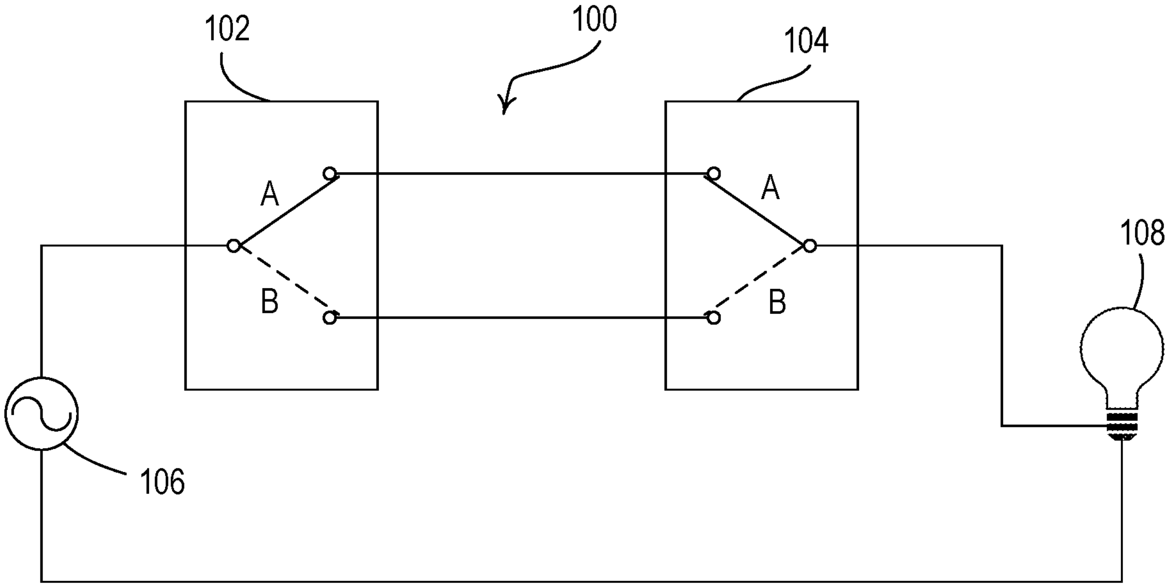
Fig. 1A Prior Art
FIG. 1A is a diagram of an example of a prior art three-way switch system, which includes two three-way switches.
Figure 1B:
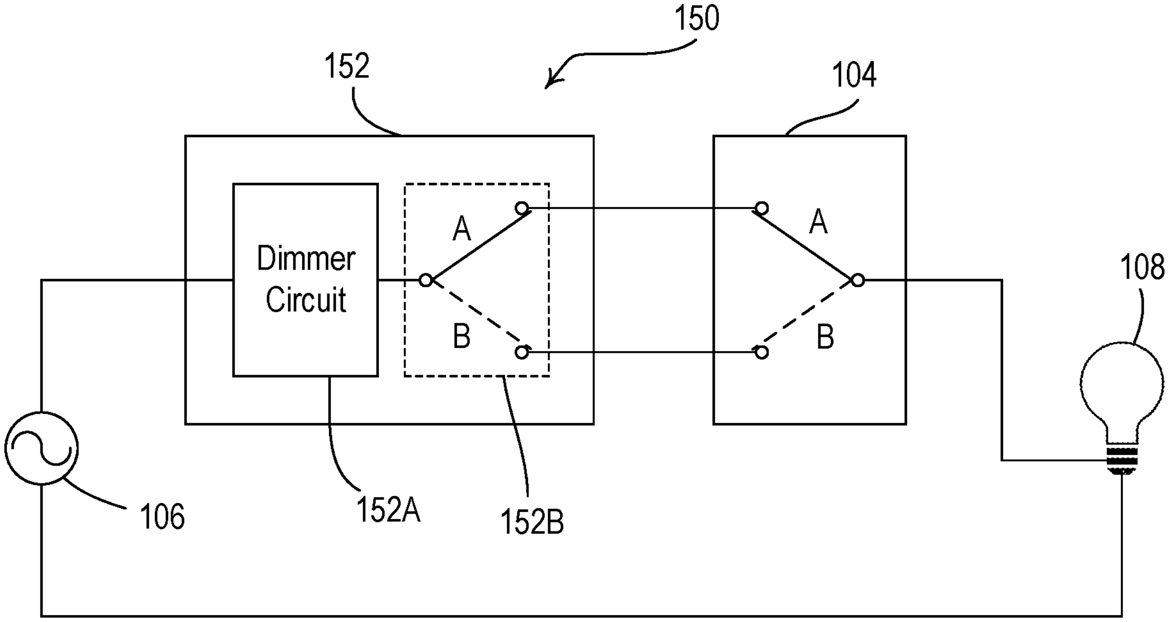
Fig. 1B Prior Art
FIG. 1B is a diagram of an example of a prior art three-way dimmer switch system including one prior art three-way dimmer switch and one three-way switch.
Figure 1C:
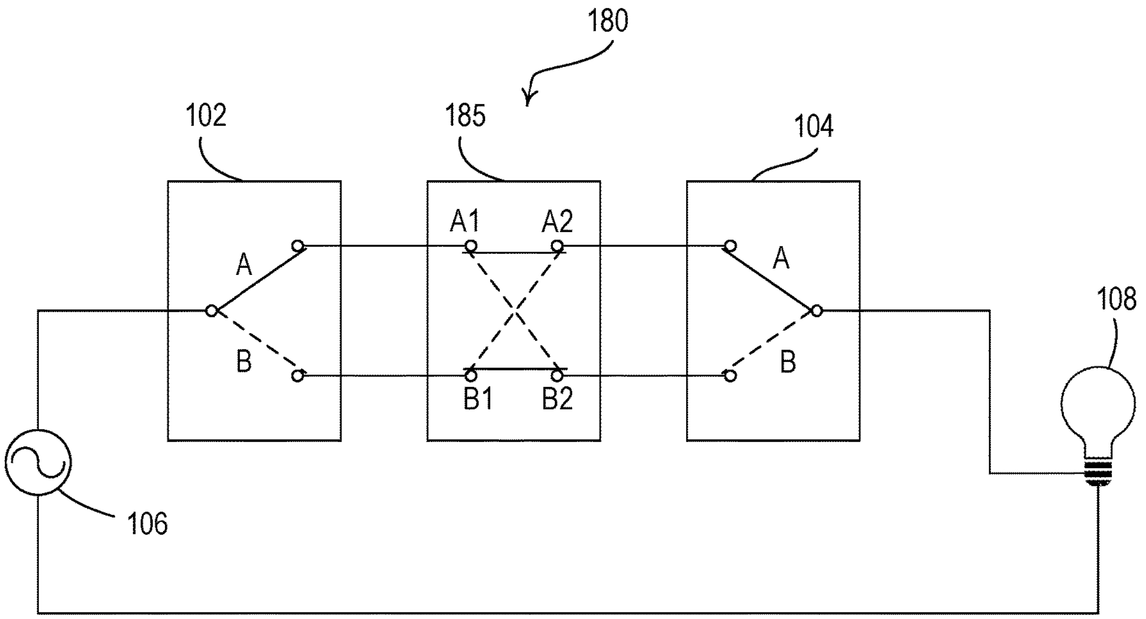
Fig. 1C Prior Art
FIG. 1C is a diagram of an example of a prior art four-way switching system.
Figure 1D:
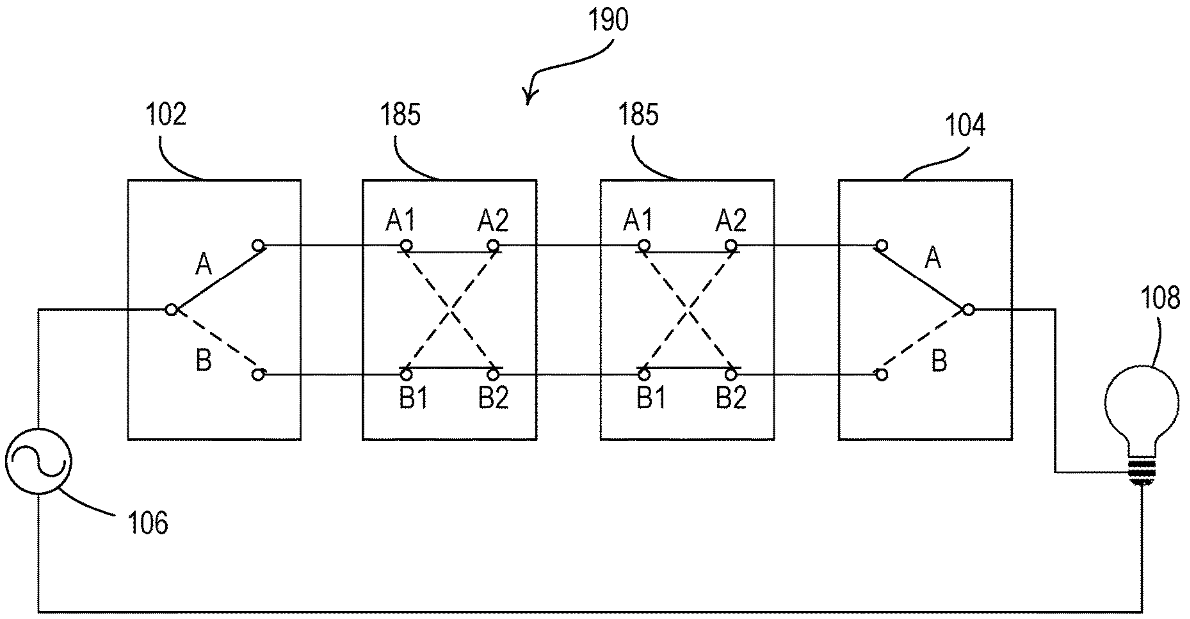
Fig. 1D Prior Art
FIG. 1D is a diagram of an example of a prior art extended four-way switching system.
Figure 2:
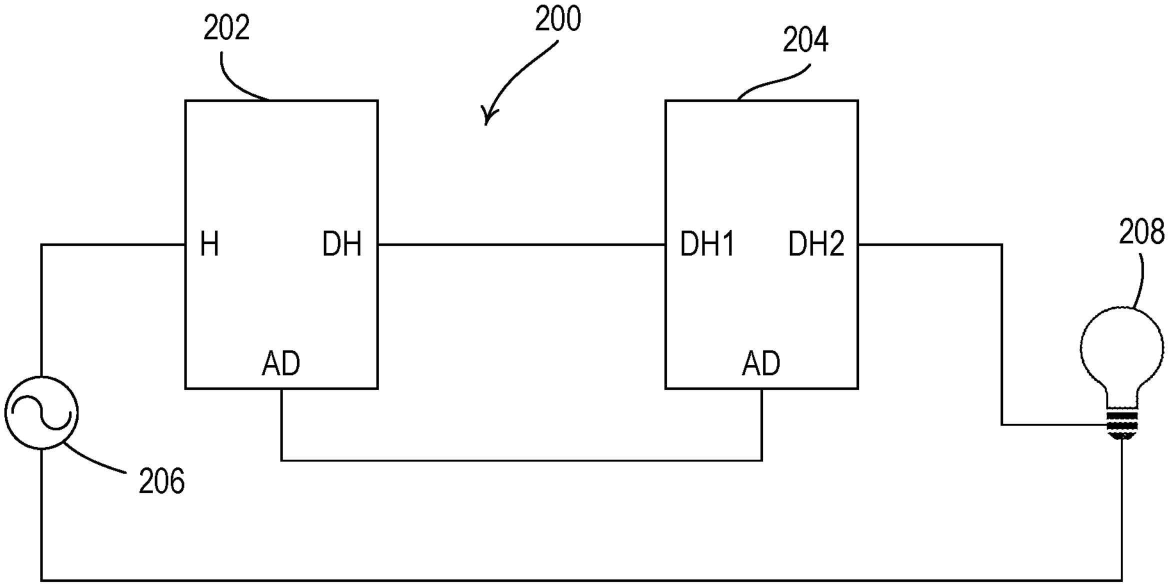
Fig. 2 Prior Art
FIG. 2 is a diagram of an example of a prior art multiple location lighting control system having a dimmer switch and a remote switch.
Figure 3:
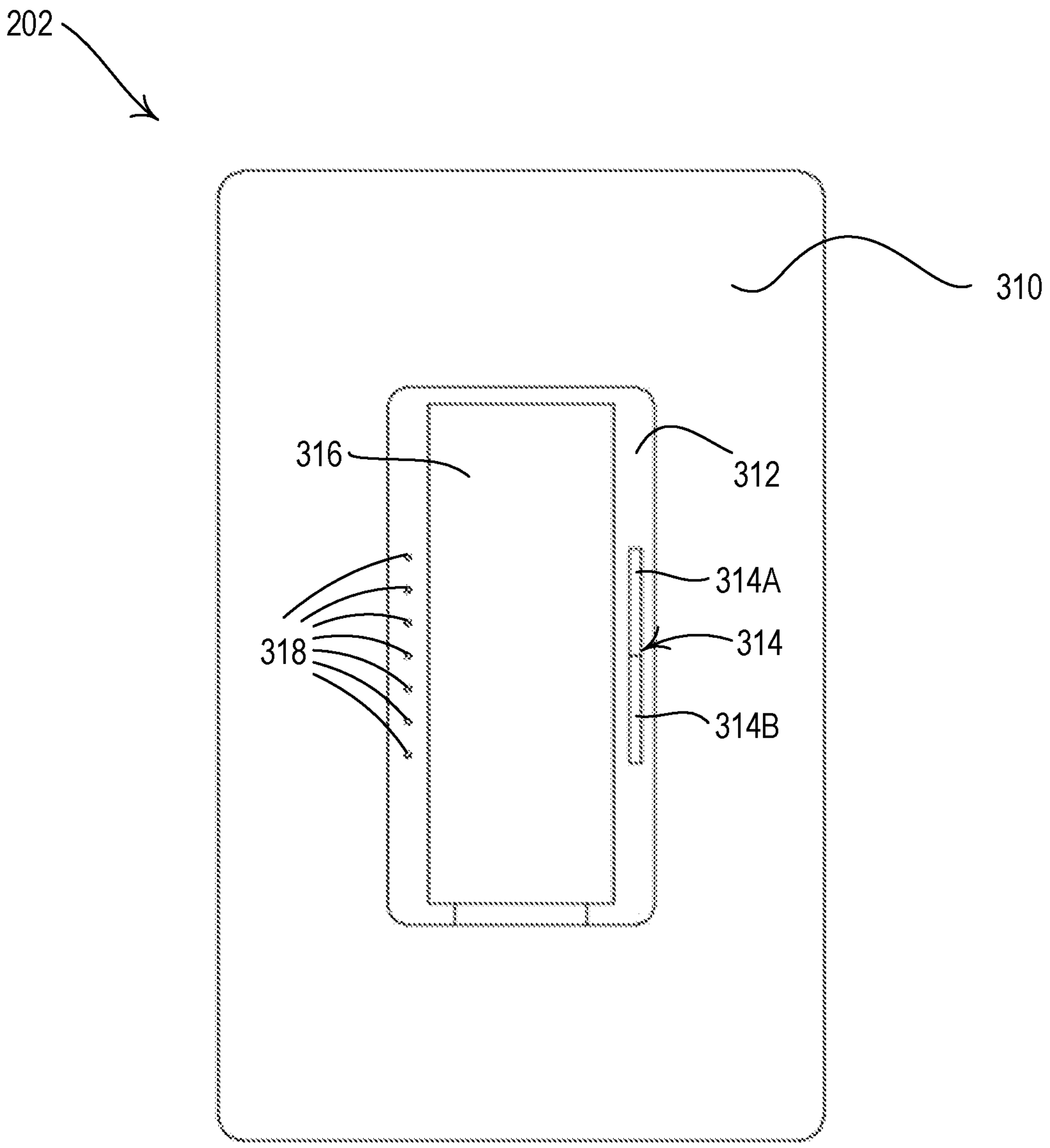
Fig. 3 Prior Art
FIG. 3 is a front view of an example of a user interface of the dimmer switch of the multiple location lighting control system of FIG. 2.
Figure 4:
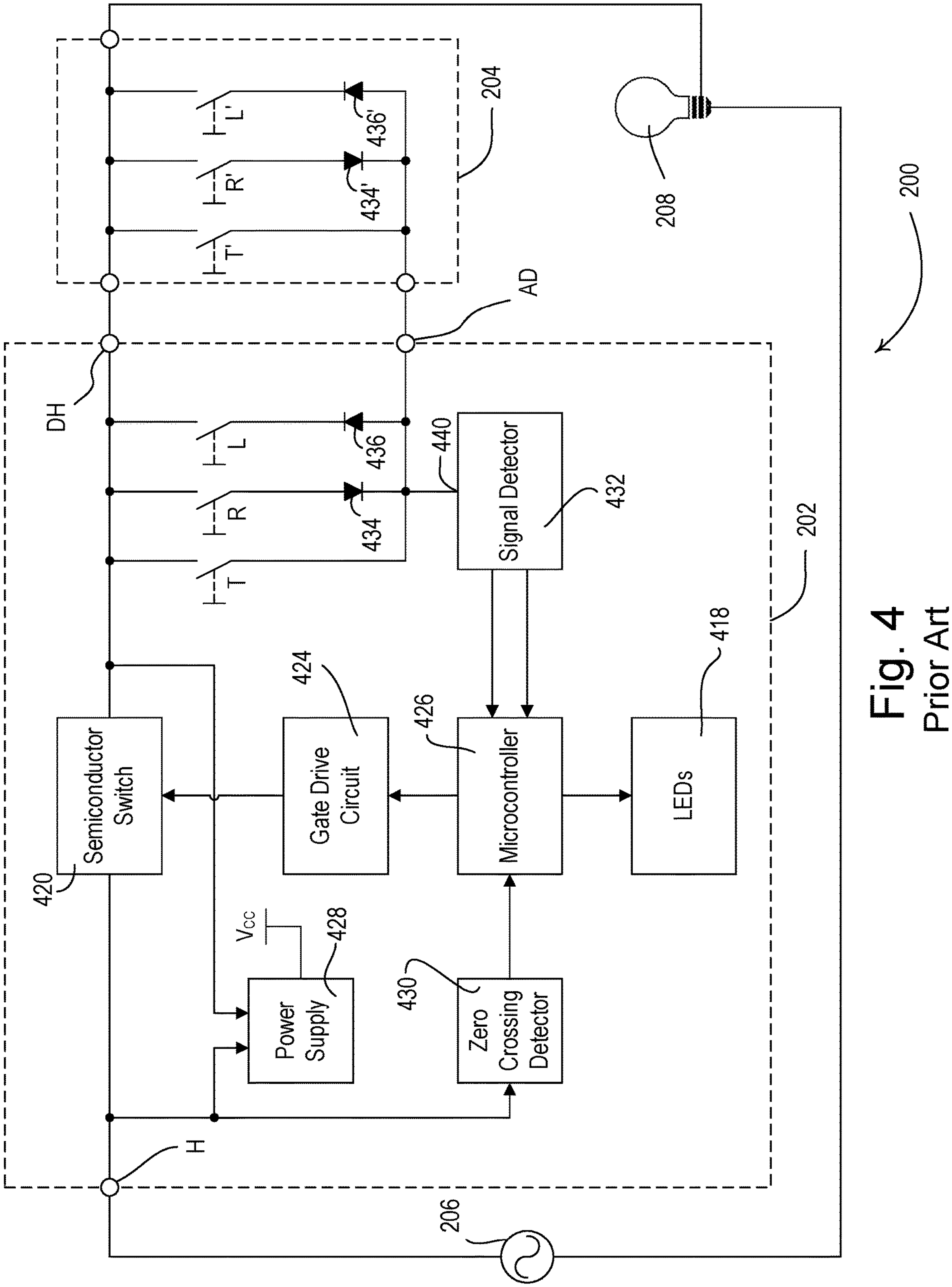
Fig. 4 Prior Art
FIG. 4 is a diagram of an example of the dimmer switch and the remote switch of the multiple location lighting control system of FIG. 2.
Figure 5A:
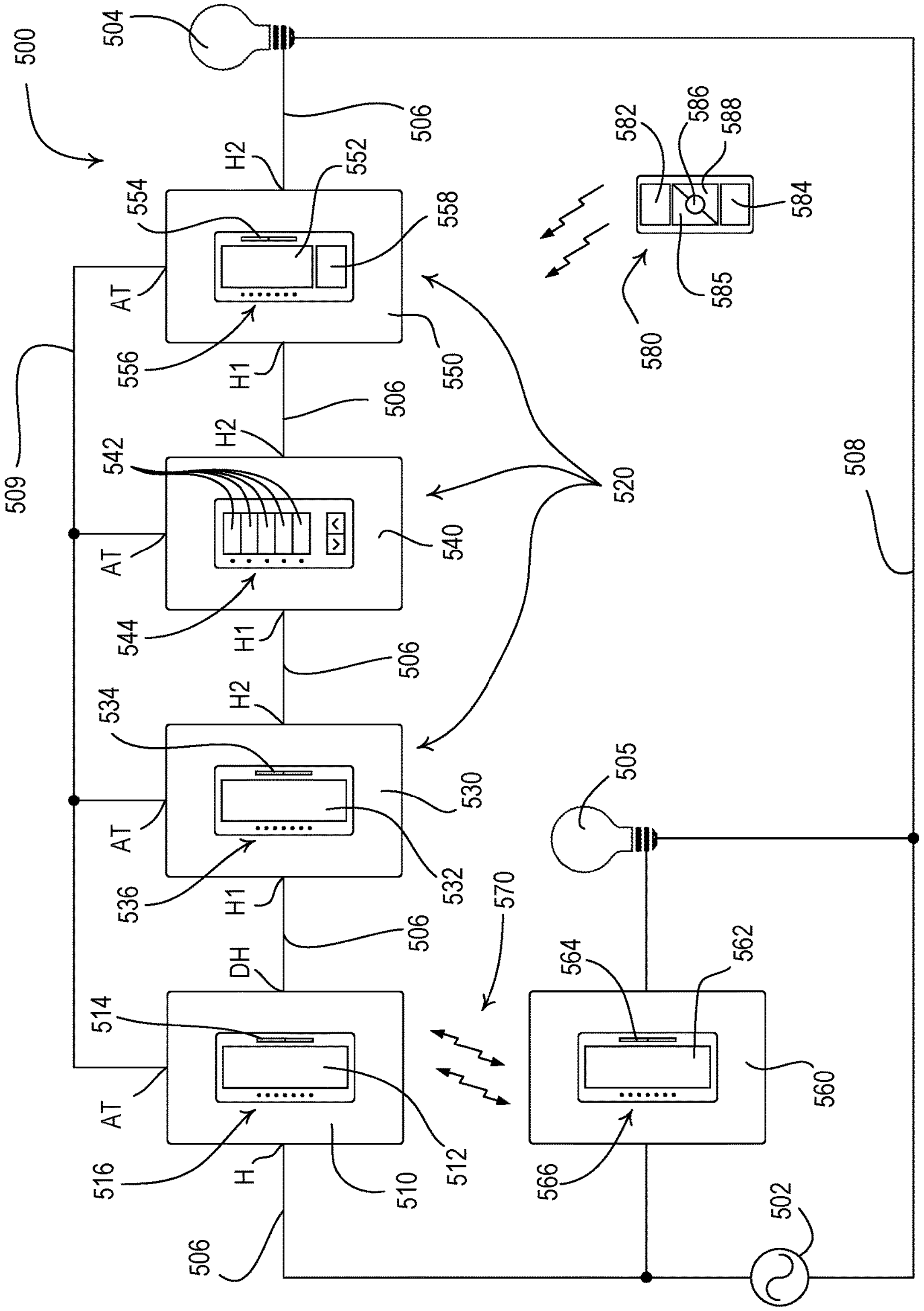
FIG. 5A is a block diagram of an example of a multiple location load control system.

FIG. 5A is a block diagram of an example of a load control system 500, e.g., a multiple location dimming system. The load control system 500 may comprise a main load control device, e.g., a main dimmer 510, and one or more accessory devices 520, e.g., remote control devices, such as an accessory dimmer 530, a remote control keypad 540, and/or a sensor control device 550. The main dimmer 510 and accessory devices 520 may be electrically coupled in series between an AC power source 502 and a lighting load 504, for example, via a traveler wiring 506. The traveler wiring 506 may conduct a load current from the AC power source 502 to the lighting load 504 through the main dimmer 510 and the accessory devices 520, for example, to provide power to the lighting load 504. A neutral wiring 508 may couple the lighting load 504 back to the AC power source 502, for example, to provide a return path for the load current conducted through the lighting load 504.

The main dimmer 510 may be wired to the line side of the load control system 500 (e.g., as shown) or the load side of the load control system 500. Although the description herein is primarily with reference to the main dimmer 510 wired to the line side of the load control system 500, one or more embodiments may comprise the main dimmer 510 wired to the load side of the load control system 500 (e.g., and the accessory devices 520 wired to the line side, accordingly). Further, any number of accessory devices 520 may be provided in the load control system 500. In addition, the main dimmer 510 may be wired in the middle of the load control system 500 with the accessory devices 520 on both the line side and the load side of the load control system 500.

The main dimmer 510 may comprise a first main terminal and a second main terminal. For example, the main dimmer 510 may comprise a hot terminal H (e.g., a line-side terminal) adapted to be coupled to the line-side of the load control system 500 and a dimmed-hot terminal DH (e.g., a load-side terminal) adapted to be coupled to the load-side of the load control system 500. The main dimmer 510 may comprise an internal load control circuit electrically coupled between the hot and dimmed-hot terminals and configured to control the amount of power delivered to the lighting load 504 (e.g., as described with reference to FIG. 6).

Figure 6:
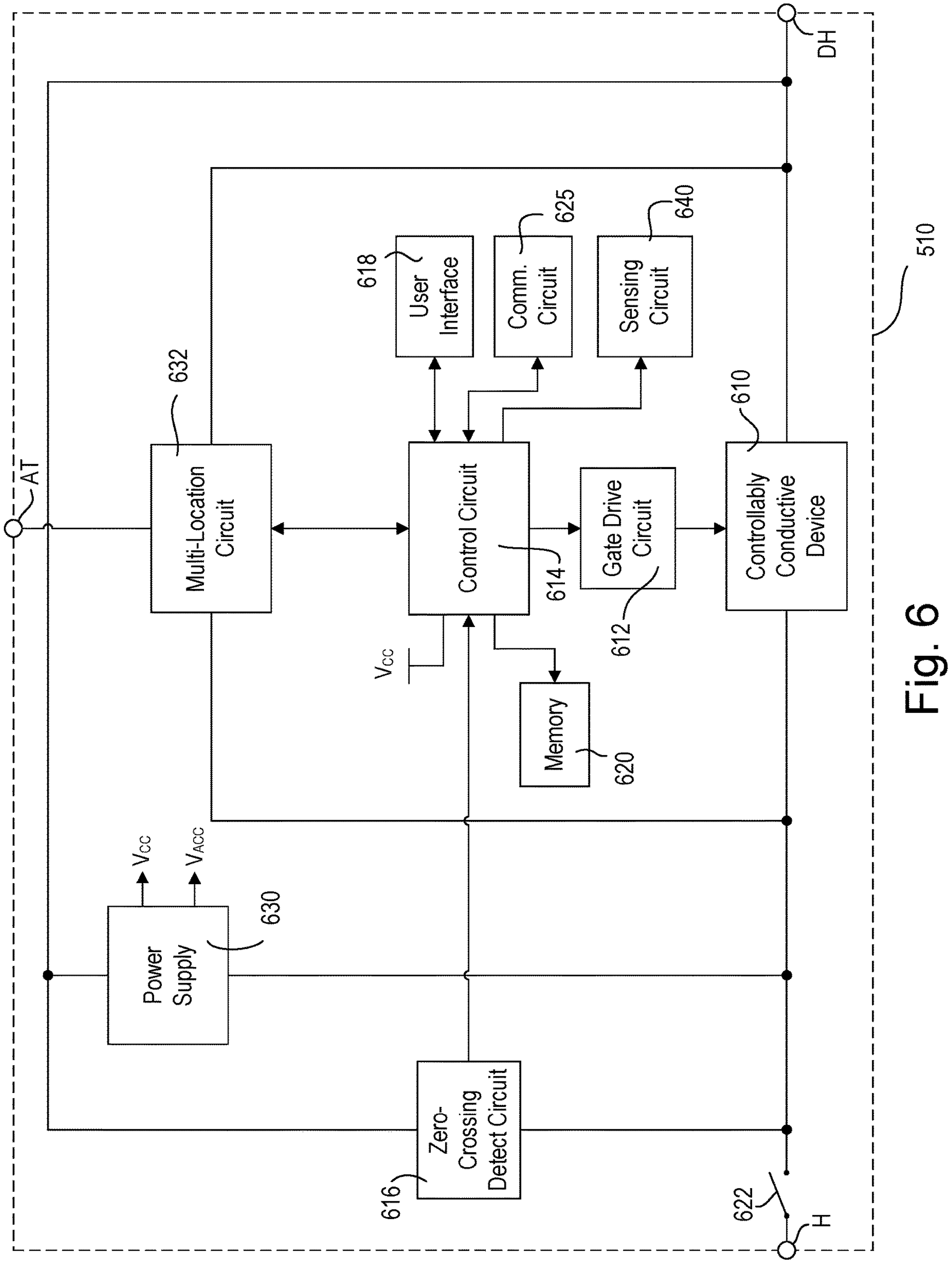
FIG. 6 is a block diagram of an example main load control device of a multiple location system.

The main dimmer 510 may include a toggle actuator 512 (e.g., a button) and/or an intensity adjustment actuator 514 (e.g., a rocker switch). Successive actuations of the toggle actuator 512 may toggle, e.g., turn on and off, the lighting load 504. Actuations of an upper portion or a lower portion of the intensity adjustment actuator 514 may respectively increase or decrease the amount of power delivered to the lighting load 504 and thus may increase or decrease the intensity of the lighting load from a minimum intensity (e.g., approximately 1%) to a maximum intensity (e.g., approximately 100%). The main dimmer 510 may comprise a plurality of visual indicators 516, e.g., light-emitting diodes (LEDs). The visual indicators 516 may be arranged in a linear array and may be illuminated to provide feedback of the intensity of the lighting load 504. The main dimmer 510 may also comprise an air-gap actuator (not shown) that allows for actuation of an internal air-gap switch (e.g., an internal air-gap switch 622 as shown in FIG. 6). Examples of wall-mounted dimmer switches are described in greater detail in U.S. Pat. No. 6,969,959, issued Nov. 29, 2005, entitled ELECTRONIC CONTROL SYSTEMS AND METHODS, and U.S. Pat. No. 9,679,696, issued Jun. 13, 2017, entitled WIRELESS LOAD CONTROL DEVICE, the entire disclosures of which are hereby incorporated by reference.

The load control system 500 may further comprise a second load control device, a second dimmer 560, electrically coupled in series between the AC power source 502 and a second lighting load 505. The second dimmer 560 may comprise an internal load control circuit for controlling the amount of power delivered to the second lighting load 505. The second dimmer 560 may comprise a toggle actuator 562 and/or an intensity adjustment actuator 564, which may operate in a similar manner as the toggle actuator 512 and the intensity adjustment actuator 514 of the main dimmer 512, respectively, e.g., to toggle the lighting load 505 on and off and to adjust the intensity of the lighting load. The second dimmer 560 may comprise a plurality of visual indicators 516, e.g., light-emitting diodes (LEDs) arranged in a linear array for providing feedback of the intensity of the lighting load 505.

The main dimmer 510 and the second dimmer 560 may be configured to transmit and receive wireless signals, e.g., radio-frequency (RF) signals 570, to communicate with each other. The main dimmer 510 and the second dimmer 560 may be assigned unique device addresses to allow for communication between the devices of the load control system 500 (e.g., between the main dimmer 510 and the second dimmer 560). The main dimmer 510 and the second dimmer 560 may be configured to control the respective lighting loads 504, 505 in response to messages (e.g., digital messages) received via the RF signals 570. The main dimmer 510 and the second dimmer 560 may be further configured to transmit digital messages including status information regarding the respective lighting loads 504, 505. The accessory devices 520 may also be configured to transmit and receive the RF signals 570. Examples wireless load control systems are described in greater detail in U.S. Pat. No. 6,803,728, issued Oct. 12, 2004, entitled SYSTEM FOR CONTROL OF DEVICES, and U.S. Pat. No. 7,880,639, issued Feb. 1, 2011, entitled METHOD OF ESTABLISHING COMMUNICATION WITH WIRELESS CONTROL DEVICES, the entire disclosures of which are hereby incorporated by reference.

The load control system 500 may further comprise a wireless remote control device 580 configured to transmit the RF signals 570. The wireless remote control device 580 may be a handheld remote control. Alternatively, the wireless remote control device 580 could be mounted vertically to a wall or supported on a pedestal to be mounted on a tabletop. The wireless remote control device 580 may comprise a microprocessor, an RF transmitter, and a battery for powering the microprocessor and the RF transmitter. The wireless remote control device 580 may comprise a plurality of actuators, e.g., an on button 582, an off button 584, a raise button 585, a lower button 586, and a preset button 588. Examples of battery-powered remote control devices are described in greater detail in commonly-assigned U.S. Pat. No. 9,361,790, issued Jun. 7, 2016, entitled REMOTE CONTROL FOR A WIRELESS LOAD CONTROL SYSTEM, the entire disclosure of which is hereby incorporated by reference.

The main dimmer 510 and the second dimmer 560 may be associated with the wireless remote control device 580 and may store the device addresses of the wireless remote control device. For example, the first dimmer 510 may be associated with the wireless remote control device 580 in response to a user actuating buttons on the first dimmer 510 and the wireless remote control device 580 (e.g., simultaneously actuating the buttons and/or actuating the buttons during an association mode). Association procedures for wireless control devices are described in greater detail in U.S. Pat. No. 5,905,442, issued May 18, 1999, entitled METHOD AND APPARATUS FOR CONTROLLING AND DETERMINING THE STATUS OF ELECTRICAL DEVICES FROM REMOTE LOCATIONS, and U.S. Patent Application Publication No. 2008/0111491, published May 15, 2008, entitled RADIO-FREQUENCY LIGHTING CONTROL SYSTEM, the entire disclosures of which are hereby incorporated by reference.

The wireless remote control device 580 may be configured to transmit digital messages to the main dimmer 510 and/or the second dimmer 560 via the RF signals 570 in response to actuations of one or more of the buttons 582-588. For example, the main dimmer 510 and/or the second dimmer 560 may be configured to turn the respective lighting load 504, 505 on in response to an actuation of the on button 582 and off in response to an actuation of the off button 584. The main dimmer 510 and/or the second dimmer 560 may be configured to raise the intensity of the respective lighting load 504, 505 in response to an actuation of the raise button 585 and lower the intensity of the respective lighting load in response to an actuation of the lower button 586. The main dimmer 510 and/or the second dimmer 560 may be configured to control the intensity of the respective lighting load 504, 505 to a respective preset intensity in response to an actuation of the preset button 588.

The accessory devices 520 (e.g., the accessory dimmer 530, the remote control keypad 540, and/or the sensor control device 550) may each comprise a first main terminal and a second main terminal. For example, each accessory device 520 may comprise two hot terminals H1, H2, which may conduct the load current from the AC power source 502 to the lighting load 504. The main dimmer 510 and the accessory devices 520 may each comprise an internal air-gap switch (e.g., air-gap switches 622, 722 shown in FIGS. 6 and 7A) for disconnecting the lighting load 504 from the AC power source 502, for example, to allow for safe servicing of the lighting load 504.

The main dimmer 510 and the accessory devices 520 may each comprise an accessory terminal AT coupled together via a single accessory wiring 509 (e.g., an electrical wire). The main dimmer 510 and the accessory devices 520 may be configured to communicate, e.g., transmit and receive digital messages, via the accessory wiring 509. The main dimmer 510 and the accessory devices 520 may not include connections to the neutral wiring 508 (e.g., the neutral side of the AC power source 502). The accessory devices 520 may each include a control circuit (e.g., which may comprise a microprocessor) and a power supply for powering the microprocessor. The main dimmer 510 may provide an accessory supply voltage $V_{ACC}$ (e.g., approximately 80-170 $V_{DC}$) on the accessory wiring 509 to enable the power supplies of the accessory devices 520 to charge during a first portion (e.g., a charging time $T_{CHRG}$) of a half cycle of the AC power source 502. During a second portion (e.g., a communication time $T_{COMM}$) of the half cycle, the main dimmer 510 and the accessory devices 520 may be configured to transmit and receive the digital messages via the accessory wiring 509.

The main dimmer 510 and/or the accessory devices 520 may be configured to control the accessory wiring 509 using tri-state logic. Tri-state logic may be referred to as tri-state communication, three-state logic, 3-state logic, and/or the like. The sender (e.g., the main dimmer 510 or the accessory devices 520) may control the accessory wiring 509 into one of three states, an active pull-up state, and active pull-down state, or a high impedance state. The main dimmer 510 and/or the accessory devices 520 may control the accessory wiring 509 using tri-state logic to, for example, charge a power supply of the accessory devices 520 and/or communicate with one another.

The accessory devices 520 may be assigned unique device addresses (e.g., in a similar manner as the main dimmer 510 and the second dimmer 560) to allow for communication with the dimmers and the other accessory devices. For example, the main dimmer 510 may be configured to assign the device addresses to the accessory devices 520 (e.g., automatically assign a device address to an accessory device when the main dimmer and the accessory device are first powered). The main dimmer 510 may be configured to transmit a digital message directly to one of the accessory devices 520 (e.g., the remote control keypad 540) by including the device address of the accessory device (e.g., a target address) in the transmitted digital message. The accessory devices 520 may be configured to include the respective device address of the accessory device (e.g., a source address) in any digital messages transmitted via the accessory wiring 509 to the main dimmer 510 and the other accessory dimmers. In response to receiving via the accessory wiring 509 a first digital message including a target address that identifies one of the other control devices of the load control system 500 (such as the second dimmer 560), the main dimmer 510 may be configured to include the device address of the transmitting accessory device 520 (e.g., the source address) in a second digital message transmitted to the other control device (e.g., the second dimmer 560) via the RF signals 570. The accessory devices 520 may also be configured to include the respective device address of the respective accessory device (e.g., the source address) in any digital messages transmitted directly via the RF signals 570 to any of the control devices of the load control system 500 (e.g., the second dimmer 560).

The accessory dimmer 530 may also include a toggle actuator 532 and an intensity adjustment actuator 534 that operate to toggle the lighting load 504 on and off and adjust the intensity of the lighting load, respectively. The accessory dimmer 530 may be configured to transmit digital messages to the main dimmer 510 via the accessory wiring 509 to cause the main dimmer to control the lighting load 504 in response to actuations of the toggle actuator 532 and the intensity adjustment actuator 534. The accessory dimmer 530 may comprise a plurality of visual indicators 536, e.g., light-emitting diodes (LEDs) arranged in a linear array. The accessory dimmer 530 may be configured to illuminate the visual indicators 536 to provide feedback of the intensity of the lighting load 504 in response to digital messages received from the main dimmer 510 via the accessory wiring 509.

The remote control keypad 540 may comprise a plurality of buttons 542 that may be actuated to control one more electrical loads remotely located from the keypad, e.g., the lighting loads 504, 505. For example, one or both of the lighting loads 504, 505 may be toggled on and off in response to actuations of one of the button 542. In addition, actuation of the button 542 may select a preset (e.g., a lighting scene) for controlling the lighting loads 504, 505 to predetermined levels according to the selected preset. The remote control keypad 540 may also comprise a plurality of visual indicators 544 (e.g., LEDs) located next to or in each of the buttons 542 for displaying feedback information regarding the status of lighting loads and/or selected presets.

The remote control keypad 540 may be configured to transmit a digital message including a command for controlling the first lighting load 504 to the main dimmer 510 via the accessory wiring 509 in response to actuations of one of the buttons 542. In addition, the remote control keypad 540 may be configured to transmit a digital message including a command for controlling the second lighting load 504 to the main dimmer 510 via the accessory wiring 509 in response to actuations of one of the buttons 542 and the main dimmer may be configured to subsequently transmit a digital message including the command for controlling the second lighting load 504 to the second dimmer 560 via the RF signals 570. Further, the remote control keypad 540 may also be configured to transmit a digital message including the command for controlling the second lighting load 504 directly to the second dimmer 560 via the RF signals 570 in response to actuations of one of the buttons 542.

The sensor control device 550 may comprise a toggle actuator 552, an intensity adjustment actuator 554, and a plurality of visual indicators 556 that operate in a similar manner as the toggle actuator 532, the intensity adjustment actuator 534, and the visual indicators 536 of the remote dimmer 530. The sensor control device 550 may be configured to transmit digital messages to the main dimmer 510 via the accessory wiring 509 to cause the main dimmer to control the lighting load 504 in response to actuations of the toggle actuator 552 and the intensity adjustment actuator 554. The sensor control device 550 may be configured to illuminate the visual indicators 556 to provide feedback of the intensity of the lighting load 504 in response to digital messages received from the main dimmer 510 via the accessory wiring 509.

The sensor control device 550 may also comprise an internal sensing circuit (not shown). For example, the internal sensing circuit may comprise an occupancy detection circuit configured to detect an occupancy or vacancy condition in the vicinity of the load control device. The occupancy detection circuit may comprise one or more detectors (e.g., a pyroelectric infrared (PIR) detector, an ultrasonic detector, and/or a microwave detector) for detecting an occupancy or vacancy condition in the space. For example, a PIR detector may be configured to receive infrared energy from an occupant in the space around the sensor control device 550 through a lens 558 to thus sense the occupancy condition in the space. In addition, the internal sensing circuit may comprise a daylight sensing circuit (e.g., including a photodiode) for measuring an ambient light level in the space around the sensor control device 550.

The sensor control device 550 may be configured to transmit digital messages to the main dimmer 510 via the accessory wiring 509 in response to detecting occupancy and/or vacancy conditions. The main dimmer 510 may be configured to turn lighting load 504 on and off in response to receiving digital message indicating occupancy and/or vacancy conditions from the sensor control device 550. The sensor control device 550 may be configured to transmit a digital message indicating an occupancy or vacancy condition to the main dimmer 510 via the accessory wiring 509 and the main dimmer may be configured to subsequently transmit a digital message indicating the occupancy or vacancy condition to the second dimmer 560 via the RF signals 570. Further, the sensor control device 550 may also be configured to transmit a digital message indicating an occupancy or vacancy condition directly to the second dimmer 560 via the RF signals 570.

The remote control keypad 540 may also comprise an internal sensing circuit (e.g., an occupancy detection circuit) for detecting occupancy and/or vacancy conditions. If the remote control keypad 540 includes such a sensing circuit, the remote control keypad 540 may be configured to transmit a digital message indicating an occupancy or vacancy condition to the main dimmer 510 via the accessory wiring 509 and the main dimmer may be configured to subsequently transmit a digital message indicating the occupancy or vacancy condition to the second dimmer 560 via the RF signals 570. Further, the remote control keypad 540 may also be configured to transmit a digital message indicating an occupancy or vacancy condition directly to the second dimmer 560 via the RF signals 570.

The main dimmer 510 and the second dimmer 560 may be associated with one or more of the accessory devices 520. For example, the second dimmer 560 may be associated with the remote control keypad 540 in response to a user actuating buttons on the second dimmer 560 and the remote control keypad 540 (e.g., simultaneously actuating the buttons and/or actuating the buttons during an association mode). The main dimmer 510 and the second dimmer 560 may store the device addresses of the accessory devices 520 to which the respective dimmers are associated. One of the accessory devices 520 (e.g., the remote control keypad 540) may be configured to transmit digital messages to the main dimmer 510 and/or the second dimmer 560 in response to actuations of one or more of the buttons 542. For example, the main dimmer 510 may receive a first digital message including the device address of the second dimmer 560 as the target address via the accessory wiring 509, and may transmit a second digital message including the device address of the second dimmer 560 as the target address to the second dimmer 560 via the RF signals 570. The main dimmer 510 and/or the second dimmer 560 may be configured to control the respective lighting load 504, 505 in response to receiving a digital message including the device address of one of the accessory devices 520 (e.g., to control the intensity of the respective lighting load 504, 505 to a respective preset intensity in response to an actuation of one of the buttons 542 of the remote control keypad 540). In addition, the second dimmer 560 may be connected to one or more accessory devices (e.g., such as the accessory devices 520) via an accessory wiring, and the main dimmer 510 and/or the second dimmer may be associated with and responsive to the accessory devices connected to the second dimmer.

The main dimmer 510 may also be configured to assign the accessory devices unique accessory addresses that may not be included in digital messages transmitted via the RF signals 570 to the other control devices of the load control system 500 (e.g., the second dimmer 560). The main dimmer 510 may be configured to transmit a digital message directly to the remote control keypad 540 by including the accessory address of the remote control keypad (e.g., a target address) in the transmitted digital message. The accessory devices 520 may be configured to include the respective accessory address (e.g., a source address) in any digital messages transmitted via the accessory wiring 509 to the main dimmer 510 and the other accessory dimmers. In response to receiving a first digital message via the accessory wiring 509 from one of the accessory devices 520, the main dimmer 510 may be configured to transmit a second digital message that includes the device address of the main dimmer 510 via the RF signals 570 to the other control devices of the load control system 500 (e.g., the second dimmer 560). The main dimmer 510 may not include the accessory address of the accessory device 520 that transmitted the first digital message in the second digital message transmitted via the RF signals 570.

The main dimmer 510 and the accessory devices 520 may operate together as a wireless link extender for the RF signals 570 of the load control system 500. For example, the wireless remote control device 580 may not be within RF communication range of the second dimmer 560, but may still be able to transmit a digital message to the second dimmer. In an example scenario, the wireless remote control device 580 may transmit a first digital message including a command for controlling the second lighting load 505 to one of the accessory devices 520 that is within the RF communication range of the wireless remote control device. The accessory device 520 may then transmit a second digital message (e.g., including the command for controlling the second lighting load 505) to the main dimmer 510 via the accessory wiring 509. The main dimmer 510 may then transmit a third digital message (e.g., including the command for controlling the second lighting load 505) to the second dimmer 560 via the RF signals 570. In another example scenario, the wireless remote control device 580 may transmit a first digital message (e.g., including a command for controlling the second lighting load 505) to the main dimmer 510, the main dimmer may then transmit a second digital message (e.g., including the command for controlling the second lighting load 505) to one of the accessory devices 520 via the accessory wiring 509, and the accessory device 520 may then transmit a third digital message (e.g., including the command for controlling the second lighting load 505) to the second dimmer 560 via the RF signals 570.

Figure 5B:
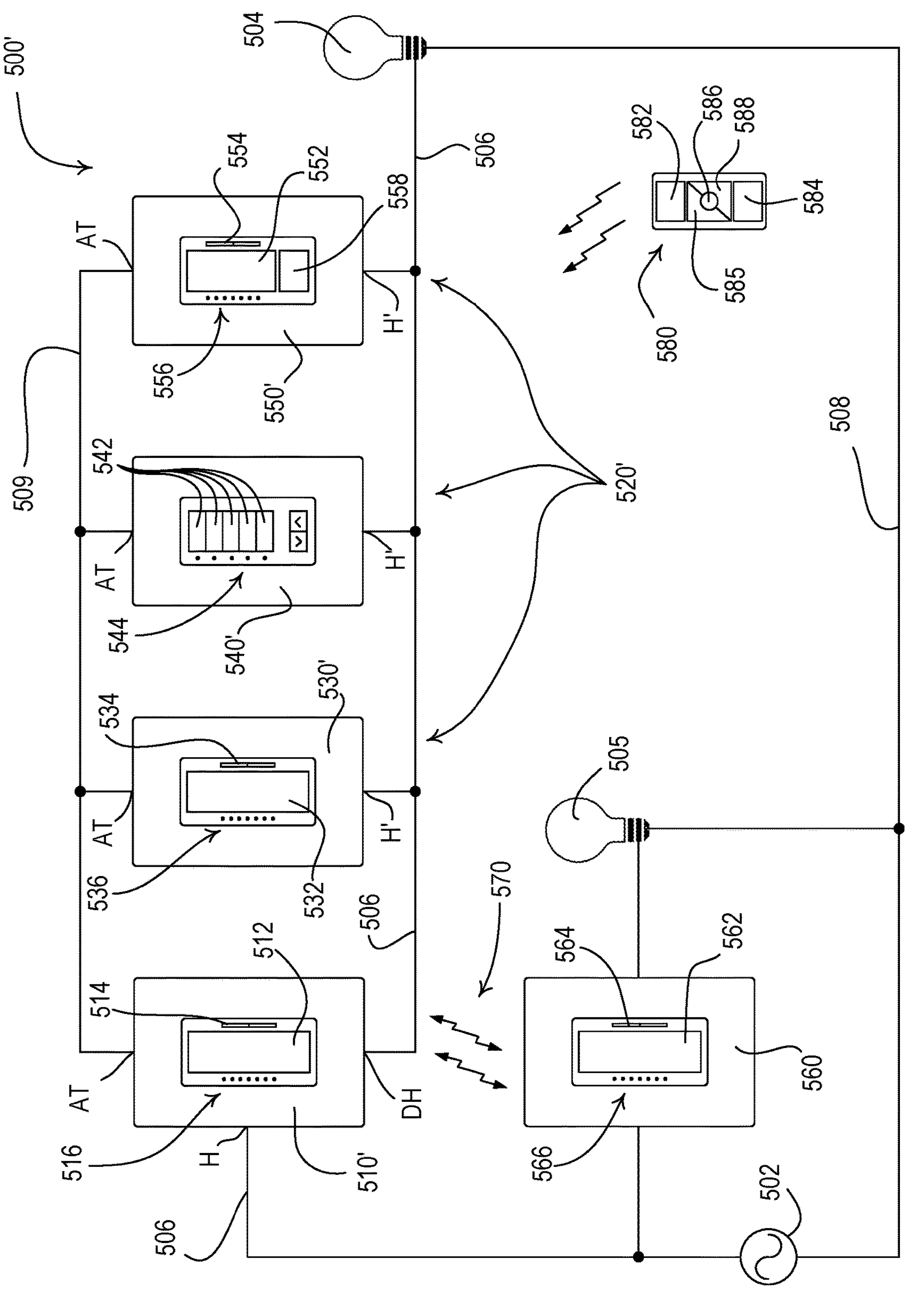
FIG. 5B is a block diagram of an example of a multiple location load control system.

FIG. 5B is a block diagram of an example of a load control system 500', e.g., a multiple location dimming system. The load control system 500' may comprise a main load control device, e.g., a main dimmer 510, and one or more accessory devices 520', e.g., remote control devices, such as an accessory dimmer 530', a remote control keypad 540', and/or a sensor control device 550'. The accessory devices 520' may be substantially similar to the accessory devices 520, except the accessory devices may comprise a single main terminal (e.g., a single hot terminal H') as opposed to the first and second hot terminals H1 and H2 and may not comprise an air-gap switch (e.g., the air-gap switch 722 shown in FIG. 7A). One or more of the embodiments described herein with reference to the load control system 500 and/or the accessory devices 520 may be applicable to the load control system 500' and/or the accessory devices 520'.

The main dimmer 510 may be electrically coupled in series between the AC power source 502 and the lighting load 504, for example, via a traveler wiring 506. The traveler wiring 506 may conduct a load current from the AC power source 502 to the lighting load 504 through the main dimmer 510, for example, to provide power to the lighting load 504. The one or more accessory devices 520' may be coupled to the traveler wiring 506 via the hot terminal H'. A neutral wiring 508 may couple the lighting load 504 back to the AC power source 502, for example, to provide a return path for the load current conducted through the lighting load 504. The main dimmer 510 may be wired to the line side of the load control system 500' (e.g., as shown) or the load side of the load control system 500'. Although the description herein is primarily with reference to the main dimmer 510 wired to the line side of the load control system 500', one or more embodiments may comprise the main dimmer 510 wired to the load side of the load control system 500' (e.g., and one or more accessory devices 520' wired to the line side, accordingly). Further, any number of (e.g., more than two) accessory devices 520' may be provided in the load control system 500'.

If the main dimmer 510 is wired to the line side of the load control system 500' (e.g., as shown in FIG. 5B), the hot terminal H' of the accessory devices 520' may be connected to the dimmed hot terminal DH of the main dimmer 510 (e.g., as shown) and to the lighting load 504 via the traveler wiring 506. If the main dimmer 510 is wired to the load side of the load control system 500', then the hot terminal H' of the accessory devices 520' may be connected to the hot terminal H of the main dimmer 510 and to the AC power source 502 via the traveler wiring 506. The main dimmer 510 and the accessory devices 520' may each comprise an accessory terminal AT coupled together via an accessory wiring 509 (e.g., a single accessory wiring). The main dimmer 510 and the accessory devices 520' may be configured to communicate, e.g., transmit and receive digital messages, via the accessory wiring 509. The main dimmer 510 and the accessory devices 520' may or may not include connections to the neutral wiring 508 (e.g., the neutral side of the AC power source 502). The accessory devices 520' may each include a control circuit (e.g., which may comprise a microprocessor) and a power supply for powering the microprocessor. The main dimmer 510 may provide an accessory supply voltage $V_{ACC}$ (e.g., approximately 80-170 $V_{DC}$) on the accessory wiring 509 to enable the power supplies of the accessory devices 520' to charge during a first portion (e.g., a charging time $T_{CHRG}$) of a half cycle of the AC power source 502. During a second portion (e.g., a communication time $T_{COMM}$) of the half cycle, the main dimmer 510 and the accessory devices 520' are configured to transmit and receive the digital messages via the accessory wiring 509.

Each of the accessory devices 520' may be configured to transmit a digital message including a command for controlling the first lighting load 504 to the main dimmer 510 via the accessory wiring 509. In addition, each of the accessory devices 520' may be configured to transmit a digital message including a command for controlling the second lighting load 504 to the main dimmer 510 via the accessory wiring 509 and the main dimmer may be configured to subsequently transmit a digital message including the command for controlling the second lighting load 504 to the second dimmer 560 via the RF signals 570. Further, each of the accessory devices 520' may also be configured to transmit a digital message including the command for controlling the second lighting load 504 directly to the second dimmer 560 via the RF signals 570 in response to actuations of one of the buttons 542.

Examples of multiple location dimming system are described in greater detail in U.S. Pat. No. 5,798,581, issued Aug. 25, 1998, entitled LOCATION INDEPENDENT DIMMER SWITCH FOR USE IN MULTIPLE LOCATION SWITCH SYSTEM, AND SWITCH SYSTEM EMPLOYING SAME; U.S. Pat. No. 7,872,429, issued Jan. 18, 2011, entitled MULTIPLE LOCATION LOAD CONTROL SYSTEM; U.S. Pat. No. 9,681,513, issued Jun. 13, 2017, entitled MULTIPLE LOCATION LOAD CONTROL SYSTEM, and U.S. Pat. No. 9,699,863, issued Jul. 4, 2017, entitled MULTIPLE LOCATION LOAD CONTROL SYSTEM, the entire disclosures of where are hereby incorporated by reference.

FIG. 6 is a block diagram of an example main load control device of a multiple location load control system (e.g., the main dimmer 510). The main dimmer 510 may comprise a controllably conductive device 610, a gate drive circuit 612, and a control circuit 614. The controllably conductive device 610 may comprise a bidirectional semiconductor switch coupled between the hot terminal H and the dimmed hot terminal DH, to control the current through, and thus the intensity of, the lighting load 504. The controllably conductive device 610 may be implemented as any suitable bidirectional semiconductor switch, such as, for example, a thyristor (such as a triac or one or more silicon-controlled rectifiers), a FET in a full-wave rectifier bridge, two FETs in anti-series connection, or one or more insulated-gate bipolar junction transistors (IGBTs). The controllably conductive device 610 may comprise a control input (e.g., gate), which is connected to the gate drive circuit 612. The input to the gate may render the controllably conductive device 610 selectively conductive or non-conductive, which in turn may control the power supplied to the lighting load 504.

The control circuit 614 may be configured to control the controllably conductive device 610 by providing a control signal to the gate drive circuit 612 using the forward phase control dimming technique and/or the reverse phase control dimming technique. For example, the control circuit 614 may comprise a microcontroller, a microprocessor, a programmable logic device (PLD), a field programmable grid array (FPGA), an application specific integrated circuit (ASIC), or any suitable processing device, controller, or control circuit. The control circuit 614 may be coupled to a zero-crossing detect circuit 616, which may determine the zero-crossing points of the AC line voltage from the AC power supply 506. As shown in FIG. 6, the zero-crossing detect circuit 616 may be coupled between the hot terminal H and the dimmed hot terminal DH. In addition, the zero-crossing detect circuit 616 may be coupled between the hot terminal H and a neutral terminal (e.g., that may be coupled to the neutral wiring 508). The control circuit 614 may generate the gate control signals to operate the controllably conductive device 610 to thus provide voltage from the AC power supply 506 to the lighting load 504 at predetermined times relative to the zero-crossing points of the AC line voltage.

The main dimmer 510 may comprise a user interface 618 that may include, for example, the toggle actuator 512 and/or the intensity adjustment actuator 514 shown in FIGS. 5A and 5B. The user interface 618 may be coupled to the control circuit 614, such that the control circuit 614 may be configured to receive inputs from the toggle actuator 512 and/or the intensity adjustment actuator 514 and to control the visual indicators 516 to provide feedback of the amount of power presently being delivered to the lighting load 504. A memory 620 may be coupled to the control circuit 614 and may be operable to store control information of the main dimmer 510 (e.g., the device addresses or accessory addresses of the accessory devices 520 to which the main dimmer is associated).

The main dimmer 510 may also include an air-gap switch 622 that may be coupled in series between the hot terminal H and the controllably conductive device 610. The air-gap switch 622 may have a normally-closed state in which the controllably conductive device 610 may be coupled in series electrical connection between the AC power source 502 and the lighting load 504. When the air-gap switch 622 is actuated (e.g., in an open state), the air-gap switch may provide an actual air-gap break between the AC power source 502 and the lighting load 504. The air-gap switch 622 may allow a user to service the lighting load 504 without the risk of electrical shock.

The main dimmer 510 may comprise a power supply 630 for generating a DC supply voltage $V_{CC}$ (e.g., approximately 3.3 volts) for powering the control circuit 614 and other low voltage circuitry of the main dimmer 510. The power supply 630 may draw current (e.g., only draw current) at the beginning of a half cycle (e.g., each half cycle) while the controllably conductive device 610 is non-conductive, for example, if the forward phase control dimming technique is used. The power supply 630 may draw (e.g., only draw) current at the end (e.g., trailing edge) of a half cycle (e.g., each half cycle) while the controllably conductive device 610 is non-conductive, for example, if the reverse phase control dimming technique is used. The power supply 630 may stop drawing current when the controllably conductive device 610 is rendered conductive. The power supply 630 may also generate an accessory supply voltage $V_{ACC}$ (e.g., approximately 80-170 $V_{DC}$) that may be provided on the accessory wiring 509 to enable the power supplies of the accessory devices 520' to charge.

The main dimmer 510 may comprise a first communication circuit, e.g., a multi-location circuit 632, which may be coupled between the hot terminal H and/or the dimmed hot terminal DH and an accessory terminal AT (which may be adapted to be coupled to the accessory wiring 509). The multi-location circuit 632 may provide a supply voltage (e.g., the accessory supply voltage $V_{ACC}$) to the accessory device 520, 520' via the accessory wiring 509 and/or allow for communication of a digital message between the main dimmer 510 and the accessory devices 520, 520' via the accessory wiring 509. The control circuit 614 may provide a control signal to the multi-location circuit 632. If the main dimmer 510 is located on the line side of the load control system 500, 500', the control circuit 614 may control the multi-location circuit 632 to allow the accessory devices 520, 520' to charge their internal power supplies and transmit and receive digital messages during the positive half cycles. If the main dimmer 510 is located on the load side of the load control system 500, 500', the control circuit 614 may control the multi-location circuit 632 to allow the accessory devices 520, 520' to charge their internal power supplies and transmit and receive digital messages during the negative half cycles. The control circuit 614 may be configured to control the controllably conductive device 610 to control the intensity of the lighting load 504 in response to digital messages received via the accessory wiring 509.

The control circuit 614 may be configured to assign unique device addresses to the accessory devices 520, 520' (e.g., automatically assign the device addresses to the accessory devices 520, 520' when the main dimmer and the accessory devices are first powered). The control circuit 614 may be configured to store the device addresses of the accessory devices 520, 520' in the memory 620. The control circuit 614 may be configured to transmit (e.g., directly transmit) a digital message to one of the accessory devices 520, 520' via the multi-location circuit 632 by including the device address of the accessory device (e.g., a target address) in the transmitted digital message.

The main dimmer 510 may be associated with one or more of the accessory device 520, 520', for example, in response to a user actuating (e.g., simultaneously actuating) a button of the main dimmer 510 (e.g., the toggle actuator 512) and a button on the accessory device (e.g., during an association mode). The control circuit 614 may store the device addresses of the accessory devices 520, 520' to which the main dimmer 510 is associated. The control circuit 614 may be configured to control the controllably conductive device 610 to control the intensity of the lighting load 504 in response to digital messages received from the accessory devices 520, 520' to which the main dimmer 510 is associated (e.g., from accessory devices that have devices addresses stored in the memory 620 as associated with the main dimmer).

The main dimmer 510 may comprise another communication circuit 625 (e.g., in addition to the multi-location circuit 632) for transmitting and/or receiving digital messages via a communications link, for example, a wired serial control link, a power-line carrier (PLC) communication link, or a wireless communication link, such as an infrared (IR) or a radio-frequency (RF) communication link (e.g., for transmitting or receiving the RF signals 570). The control circuit 614 may be configured to control the controllably conductive device 610 to control the intensity of the lighting load 504 in response to digital messages received via the communication circuit 625. An example of a load control device able to transmit and receive digital messages on an RF communication link is described in commonly assigned U.S. Pat. No. 5,905,442, issued May 18, 1999, entitled METHOD AND APPARATUS FOR CONTROLLING AND DETERMINING THE STATUS OF ELECTRICAL DEVICES FROM REMOTE LOCATIONS, the entire disclosure of which is hereby incorporated by reference.

The main dimmer 510 may be configured to be associated with an accessory device connected to another dimmer via an accessory wiring (e.g., in response to a user simultaneously actuating the toggle actuator 512 of the main dimmer 510 and a button on the accessory device). The control circuit 614 may store the device addresses of the accessory devices that are connected to the other dimmer and to which the main dimmer 510 is associated. The control circuit 614 may be configured to control the controllably conductive device 610 to control the intensity of the lighting load 504 in response to digital messages received via the communication circuit 625 (e.g., via the RF signals 570) from the other dimmer that include source addresses of accessory devices to which the main dimmer 510 is associated.

The control circuit 614 may be configured to relay digital messages between one of the accessory devices 520, 520' connected to the main dimmer 510 via the multi-location circuit 632 and another control device of the load control system 500 (e.g., the second dimmer 560). The control circuit 614 may be configured to transmit digital messages via the communication circuit 625 in response to digital messages received via the multi-location circuit 632. The control circuit 614 may be configured receive a first digital message including the device address of the second dimmer 560 as the target address via the multi-location circuit 632, and may transmit a second digital message including the device address of the second dimmer 560 as the target address to the second dimmer 560 via the communication circuit 625. For example, the control circuit 614 may be configured to transmit a digital message to the second dimmer 560 via the communication circuit 625 in response to receiving a command to control the second lighting load 505 from the remote control keypad 540 via the multi-location circuit 632.

In addition, the control circuit 614 may be configured to control the multi-location circuit 632 to transmit digital messages to the accessory devices 520, 520' in response to receiving a digital message via the communication circuit 625. The control circuit 614 may be configured receive a third digital message including the device address of one of the accessory devices 520, 520' as the target address via the communication circuit 625, and may transmit a fourth digital message including the device address of the accessory device as the target address to the accessory device via the multi-location circuit 632. For example, the control circuit 614 may be configured to transmit a digital message including status information of the second lighting load 505 to the remote control keypad 540 via the multi-location circuit 632 in response to receiving a digital message from the second dimmer 560 via the communication circuit 625, and the remote control keypad 540 may be configured to control the visual indicators 544 in response to the status information in the digital message received via the accessory wiring 509.

The control circuit 614 may be configured to relay digital messages between control devices of the load control system 500 to which neither the main dimmer 510 nor the accessory devices 520, 520' are associated (e.g., the second dimmer 560 and the wireless remote control device 580). For example, the control circuit 614 may be configured receive via the communication circuit 625 a digital message including the device address of a control device to which neither the main dimmer 510 nor the accessory devices 520, 520' are associated. The control circuit 614 may be configured to determine that the control device from which the digital messages was received is within wireless range of one of the accessory devices 520, 520' and may be configured to transmit the digital message to the accessory device via the multi-location circuit 632. For example, the control circuit 614 may store in the memory 620 (e.g., in a range list) the device addresses of the control device that are within wireless range of one or more of the accessory devices 520, 520' (e.g., but may be not be within wireless range of the main dimmer 510). The control circuit 614 may be configured to determine the addresses of control devices that are within wireless range of the main dimmer 510 and store those addresses in the memory 620 (e.g., in a range list). The control circuit 614 may be configured to transmit the range list including the addresses of control devices within range of the main dimmer 510 to the accessory devices 520, 520' via the multi-location circuit 632. The control circuit 614 may be configured to receive a digital message from one of the accessory devices 520, 520' via the multi-location circuit 632 and transmit the digital message to another control device via the communication circuit 625 (e.g., if the other control device is within wireless range of the main dimmer 510).

The main dimmer 510 may further comprise a sensing circuit 640, e.g., an occupancy detection circuit operable to detect an occupancy or vacancy condition in the vicinity of the load control device. The sensing circuit 640 may comprise a detector (e.g., a pyroelectric infrared (PIR) detector, an ultrasonic detector, and/or a microwave detector) for detecting an occupancy or vacancy condition in the space. The control circuit 614 may be configured to determine a vacancy condition in the space after a timeout period expires since the last occupancy condition was detected. The control circuit 614 may be configured to control the controllably conductive device 610 to control the intensity of the lighting load 504 in response to the sensing circuit 640 detecting occupancy and/or vacancy conditions. The sensing circuit 640 may also comprise a daylight sensing circuit (e.g., including a photodiode) for measuring an ambient light level in the space around the main dimmer 510.

Figure 7A:
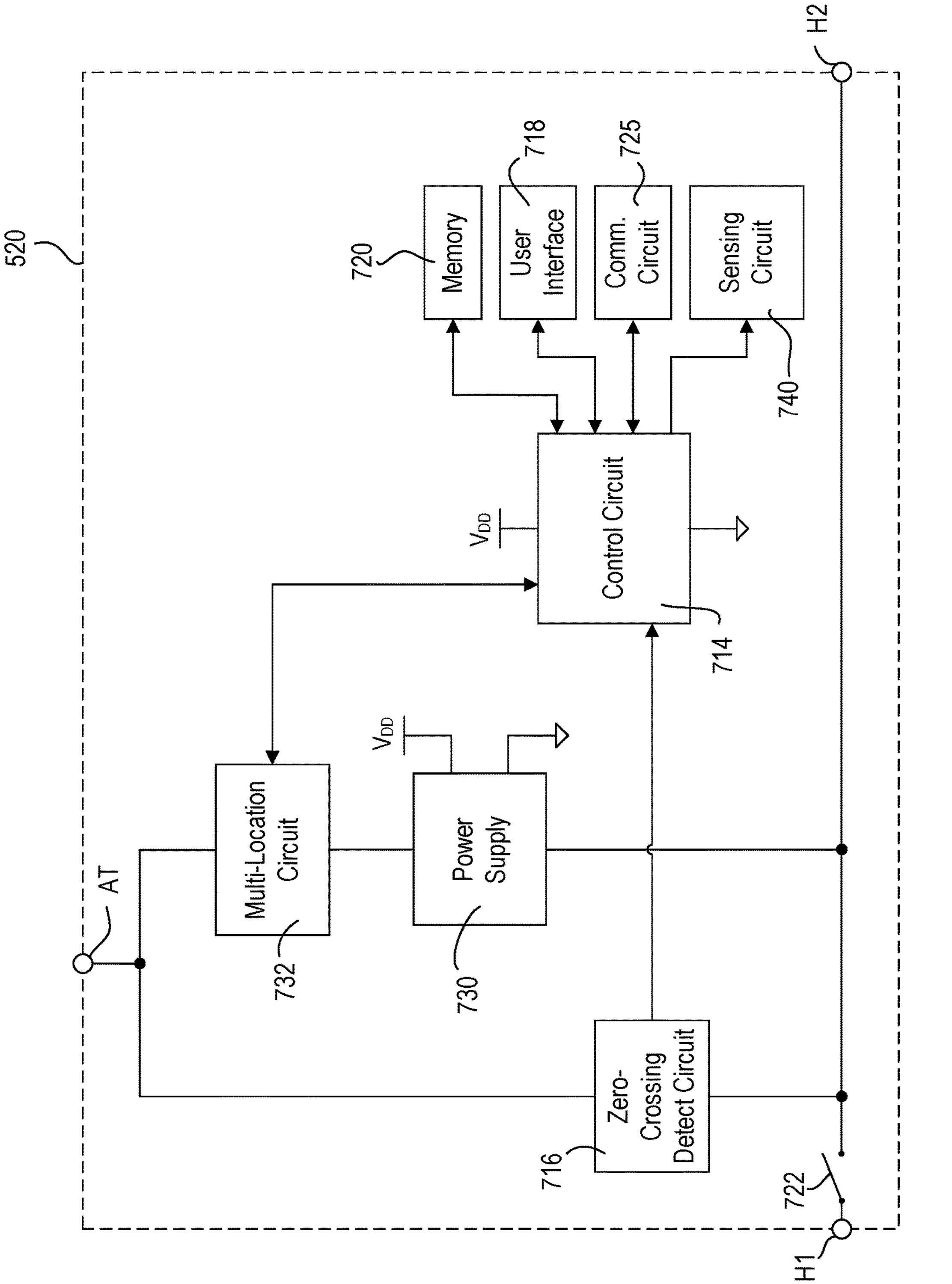
FIG. 7A is a block diagram of an example remote load control device of a multiple location system.

FIG. 7A is a diagram of an example accessory device of a multiple location load control system, e.g., one of the accessory devices 520 of the load control system 500 shown in FIG. 5A. The accessory device 520 may comprise one or more of the same functional blocks as the main dimmer 510. The accessory device 520 may include a control circuit 714 that may comprise a microcontroller, a microprocessor, a programmable logic device (PLD), a field programmable grid array (FPGA), an application specific integrated circuit (ASIC), or any suitable processing device, controller, or control circuit. The control circuit 714 may be coupled to a zero-crossing detect circuit 716, which may determine the zero-crossing points of the AC line voltage from the AC power supply 506. The control circuit 714 may be coupled to a memory 720, which may be operable to store control information of the accessory device 520 (e.g., the device address or accessory address of the accessory device 520).

The control circuit 714 may be coupled to a user interface 718 for receiving inputs and is configured to control LEDs to provide feedback of the amount of power presently being delivered to the lighting load 504. The user interface 718 may comprise, for example, the toggle actuator 532, the intensity adjustment actuator 534, and the visual indicators 536 of the accessory dimmer 530, the buttons 542 and the visual indicators 544 of the remote control keypad 540, and/or the toggle actuator 552, the intensity adjustment actuator 554, and the visual indicators 556 of the sensor control device 550.

The accessory device 520 may comprise first and second hot terminals H1, H2 that may be coupled in series with the controllably conductive device 610 of the main dimmer 510, and may be adapted to conduct the load current from the AC power source 502 to the lighting load 504. The accessory device 520 may also comprise an accessory terminal AT that is adapted to be coupled to the accessory terminal AT of the main dimmer 510 via the accessory wring 509. The accessory device 520 may comprise a power supply 730 may be coupled between a multi-location circuit 732 and the first and second hot terminals H1, H2. The power supply 730 may be configured to draw power from the main dimmer 510, via the multi-location circuit 732, during the charging time period $T_{CHRG}$ of a half cycle. The power supply 730 may generate a DC output voltage $V_{DD}$ (e.g., approximately 3.3 volts) for powering the control circuit 714 and other low voltage circuitry of the accessory device 520.

The zero-crossing detect circuit 716 may be coupled between the accessory terminal AT and the first and second hot terminals H1, H2. The zero-crossing detect circuit 716 may detect a zero-crossing and/or may couple the accessory supply voltage $V_{AC}$C across the zero-crossing detect circuit 716. The control circuit 714 may begin timing at a zero-crossing (e.g., each zero-crossing) and may be operable to transmit and receive digital messages via the multi-location circuit 732, for example, after the charging time period $T_{CHRG}$ expires. The multi-location circuit 732 may be coupled between the accessory wiring 509 and the power supply 730. The multi-location circuit 732 and power supply 730 of the accessory device 520 may be coupled in parallel with the multi-location circuit 732 of the main dimmer 510 forming a communication path during the communication time period $T_{COMM}$ in the positive and/or negative half cycles, for example, depending on which side of the load control system 500 to which the main dimmer 510 is coupled. Accordingly, the communication path between the main dimmer 510 and the accessory device 520 may not pass through the AC power source 502 or the lighting load 504.

The control circuit 714 may be configured to be assigned a unique device address by the main dimmer 510 (e.g., automatically assigned the device address when the main dimmer and the accessory devices are first powered). The control circuit 714 may be configured to store the device address of the accessory devices 520 in the memory 720. The control circuit 714 may be configured to transmit and receive digital messages via the multi-location circuit 732 using the device address. The control circuit 714 may be configured to transmit a digital message directly to the main dimmer 510 via the multi-location circuit 732 by including the device address of the main dimmer (e.g., a target address) in the transmitted digital message. The control circuit 714 may be configured to transmit digital messages via the multi-location circuit 732 in response to actuation of one or more buttons of the user interface 718. For example, the control circuit 714 may be configured to transmit a digital message including a command for controlling the first lighting load 504 to the main dimmer 510 via the multi-location circuit 732. The control circuit 714 may be configured to illuminate one or more visual indicators of the user interface 718 in response to receiving digital messages via the multi-location circuit 732.

The accessory device 520 may be associated with the main dimmer 510, for example, in response to a user actuating (e.g., simultaneously actuating) a button on the main dimmer 510 (e.g., the toggle actuator 512) and a button of the accessory device 520, such as the one of the buttons 542 on the remote control keypad 540 (e.g., during an association mode). The control circuit 714 may store the device addresses of the main dimmer 510 to which the accessory device 520 is associated. The main dimmer 510 may be configured to control the intensity of the lighting load 504 in response to digital messages received from the accessory devices 520 to which the main dimmer 510 is associated. The accessory device 520 may also be configured to be associated with a control device of the load control system 500 to which the accessory device not connected via the accessory wiring 509 (e.g., the second dimmer 560), for example, in response to a user simultaneously actuating the toggle actuator 562 of the second dimmer 560 and a button on the accessory device (e.g., one of the buttons 542 on the remote control keypad 540). For example, the control circuit 714 may be configured to transmit a digital message to the second dimmer 510 via the multi-location circuit 732 by including the device address of the main dimmer (e.g., a target address) in the transmitted digital message The accessory device 520 may comprise a communication circuit 725 that may be configured to transmit and/or receive digital messages via a communications link, for example, a wired serial control link, a power-line carrier (PLC) communication link, or a wireless communication link, such as an infrared (IR) or a radio-frequency (RF) communication link. For example, the control circuit 714 may be configured to communicate digital messages directly with a control device of the load control system 500 to which the accessory device not connected via the accessory wiring 509 (e.g., the second dimmer 560) via the communication circuit 725. The control circuit 714 may be configured to transmit digital messages via the communication circuit 725 in response to actuation of one or more buttons of the user interface 718. The control circuit 714 may be configured to illuminate one or more visual indicators of the user interface 718 in response to receiving digital messages via the communication circuit 725. For example, the control circuit 714 may be configured to transmit a digital message to the second dimmer 560 via the communication circuit 725 by including the device address of the second dimmer (e.g., a target address) in the transmitted digital message.

The control circuit 714 may be configured to relay digital messages between control devices of the load control system 500 to which neither the main dimmer 510 nor the accessory devices 520 are associated (e.g., the second dimmer 560 and the wireless remote control device 580). For example, the control circuit 714 may be configured receive via the communication circuit 725 a digital message including the device address of a control device to which neither the main dimmer 510 nor the accessory devices 520 are associated. The control circuit 714 may be configured to determine that the control device from which the digital messages was received is within wireless range of the main dimmer 510 and may be configured to transmit the digital message to the main dimmer via the multi-location circuit 632. For example, the control circuit 714 of the accessory device 520 may be configured to store in the memory 720 (e.g., in a range list) the device addresses of the control device that are within wireless range of main dimmer 510 (e.g., but may be not be within wireless range of the accessory device). The control circuit 714 may be configured to determine the addresses of control devices that are within wireless range of the accessory device 520 and store those addresses in the memory 720 (e.g., in a range list). The control circuit 714 may be configured to transmit the range list including the addresses of control devices within range of the accessory device 520 to the main dimmer and/or the other accessory devices via the multi-location circuit 732. The control circuit 714 may be configured to receive a digital message from the main dimmer 510 and/or one of the other accessory devices 520 via the multi-location circuit 732 and transmit the digital message to another control device via the communication circuit 725 (e.g., if the other control device is within wireless range of the accessory device 520).

The accessory device 520 may include a sensing circuit 740 that may comprise, for example, an occupancy detection circuit operable to detect an occupancy or vacancy condition in the vicinity of the accessory device 520. The sensing circuit 740 may comprise a detector (e.g., a pyroelectric infrared (PIR) detector, an ultrasonic detector, and/or a microwave detector) for detecting an occupancy or vacancy condition in the space. The control circuit 714 may be configured to determine a vacancy condition in the space after a timeout period expires since the last occupancy condition was detected. The control circuit 714 may be configured to transmit a digital message via the multi-location circuit 732 and/or via the communication circuit 725 in response to the sensing circuit 740 detecting occupancy and/or vacancy conditions. The sensing circuit 740 may also comprise a daylight sensing circuit (e.g., including a photodiode) for measuring an ambient light level in the space around the accessory device 520.

The opening of an air-gap switch 722 of the accessory device 520 may provide a true air-gap disconnect between the AC power source 502 and the lighting load 504. The zero-crossing detect circuit 716, the power supply 730, and the multi-location circuit 732 of the accessory device 520 may include diodes coupled to the accessory terminal AT, such that the accessory terminal AT of the accessory device 520 may be operable (e.g., only operable) to conduct current into the accessory device 520. The path for leakage current through the load control system 500 may be through the dimmed hot terminal DH and out of the accessory terminal AT of the main dimmer 510. The orientation of the first and second hot terminals H1 and H2 of the accessory device 520 with respect to the main dimmer 510 may be reversed, for example, such that the second hot terminal H2 of the accessory device 520 may be coupled to the dimmed hot terminal DH of the main dimmer 510 and the first hot terminal H1 of the accessory device 520 may be coupled to the lighting load 504. This may be performed to the path for leakage current to the lighting load 504 through the accessory terminal AT of the accessory device 520. The components chosen for these circuits may be such that the magnitude of the leakage current through the main dimmer 510 is limited to an appropriate level to meet the UL standard for leakage current when the air-gap switch 622 is opened.

When any of the main dimmer 510 and the accessory devices 520 are wired directly to the AC power source 502 and the lighting load 504, the respective air-gap switches 622, 722 may be positioned towards the AC power source and the lighting load, such that opening the air-gap switches 622, 722 may provide a true air-gap disconnect between the AC power source 502 and the lighting load 504. However, if any of the main dimmer 510 and the accessory devices 520 that are wired directly to the AC power source 502 and the lighting load 504 do not have their air-gap switches 622, 722 positioned towards the AC power source 502 and the lighting load 504, the leakage current through the main dimmer 510 and the accessory devices 520 may be limited to meet the UL standard for leakage current when an air-gap switch is opened. The leakage current may be limited in this way when the air-gap switches 622, 722 of any of the main dimmer 510 and the accessory devices 520 that are wired in the middle of the load control system 500 are opened.

Figure 7B:
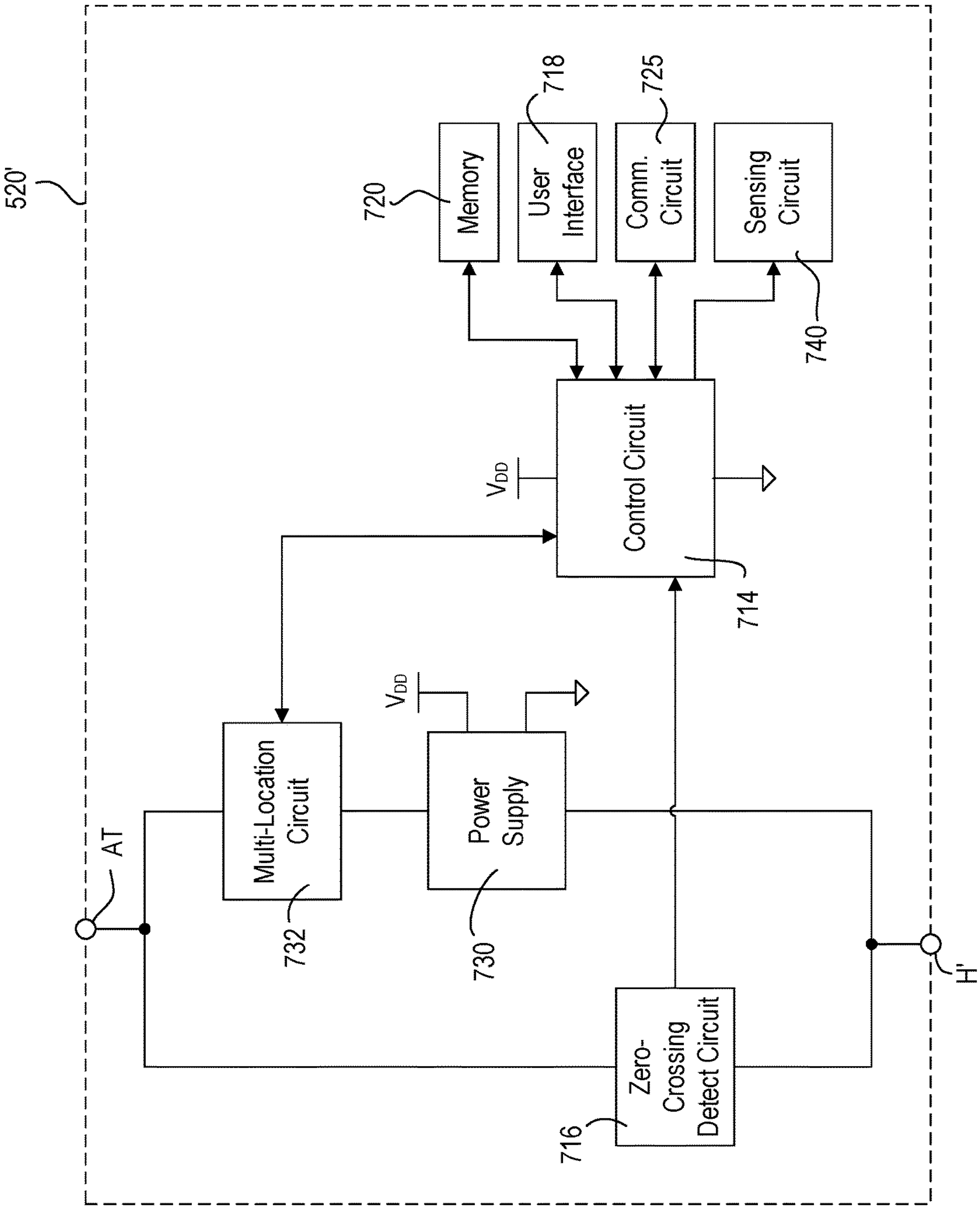
FIG. 7B is a block diagram of another example remote load control device of a multiple location system.

FIG. 7B is a diagram of another example accessory device of a multiple location load control system, e.g., one of the accessory devices 520' of the load control system 500' shown in FIG. 5B. The accessory device 520' may comprise one or more of the same functional blocks as the accessory device 520. The accessory device 520' may not comprise an air-gap switch (e.g., such as the air-gap switch 722 of the accessory device 520 shown in FIG. 7A). As such, the accessory device 520' may comprise a single hot terminal H' as opposed to the first and second hot terminals H1 and H2 of the accessory device 520 shown in FIG. 7A. The single hot terminal H' of the accessory device 520' may be connected to the dimmed hot terminal DH of the main dimmer 510 and to the lighting load 504 (e.g., and the single H terminal of one or more additional accessory devices 520'), for example, as illustrated in FIG. 5B. Alternatively, the single hot terminal H' may be connected to the hot terminal H of the main dimmer 510 and the AC power source 502, for example, if the main dimmer 510 is wired to the line side. The single hot terminal H' of the accessory device 520' may be coupled to the controllably conductive device 710 of the main dimmer 510, for example, via the hot terminal H or the dimmed-hot terminal DH. The accessory device 520' may not be adapted to conduct the load current from the AC power source 502 to the lighting load 504, since for example, the dimmed-hot terminal DH of the main dimmer 510 may be connected directly to the lighting load 504 (e.g., without traveling through the accessory device 520'). The accessory terminal AT of the accessory device 520' may be adapted to be coupled to the accessory terminal AT of the main dimmer 510 via the accessory wiring 509.

Figure 8:
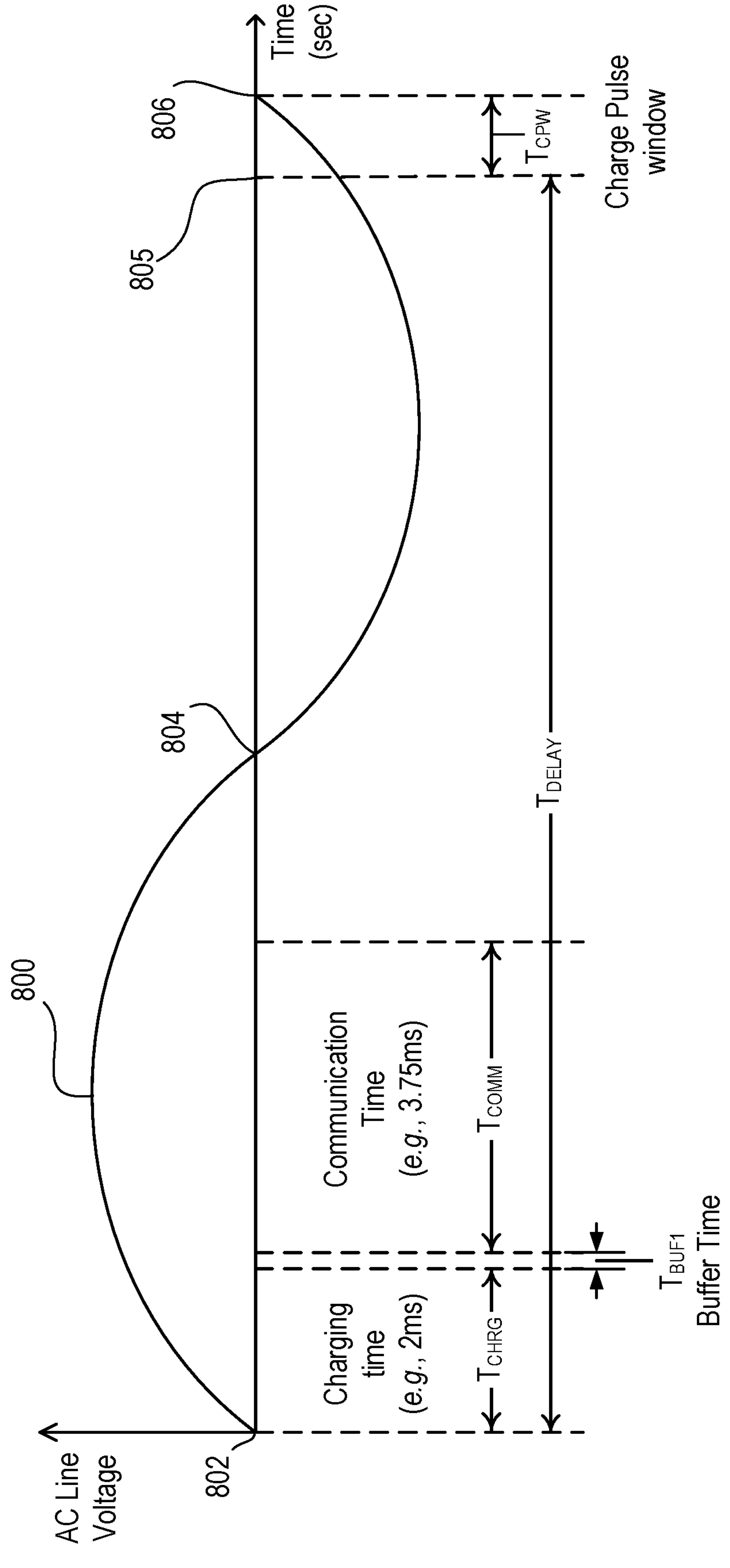
FIG. 8 is a timing diagram of an example of a complete line cycle of an AC voltage waveform provided by an AC power source illustrating the operation of a main load control device of a multiple location load control system.

FIG. 8 is a timing diagram of an example of a complete line cycle of an AC voltage waveform 800 provided by an AC power source (e.g., the AC power source 502). The timing diagram of FIG. 8 illustrates an example of the operation of a main load control device (e.g., the main dimmer 510) of a multiple location load control system during each line cycle of the AC voltage waveform 800. The main dimmer may be operable to allow one or more accessory devices (e.g., the accessory devices 520, 520' connected to the accessory wiring 509) to charge their internal power supplies during a charging time period $T_{CHRG}$. The charging time period $T_{CHRG}$ may occur after a zero-crossing 802 at the beginning of the positive half cycle of the AC voltage waveform 800. The charging time period $T_{CHRG}$ may be approximate 2 milliseconds in duration. The accessory wiring may be pulled up by the main dimmer during the charging time period $T_{CHRG}$ to charge the power supplies of the accessory devices.

After the charging time period $T_{CHRG}$, a first buffer time $T_{BUF1}$ may be used to ensure that the state of the accessory wiring 509 during the charging time period $T_{CHRG}$ is not misinterpreted as part of a digital message during the communication time period $T_{COMM}$.

After the buffer time $T_{BUF1}$, the main dimmer and one or more of the accessory devices may be operable to transmit and receive digital messages via the accessory wiring during the communication time period $T_{COMM}$. The communication time period $T_{COMM}$ may occur after the buffer time $T_{BUF1}$ and during the positive half cycle of the AC voltage waveform 800. The communication time period $T_{COMM}$ may be approximate 3.75 milliseconds. The communication time period $T_{COMM}$ may be a dedicated time slot for communication between the main dimmer 510 and one or more accessory devices. The main dimmer and/or accessory device may pull up and/or pull down the accessory wiring to transmit a digital message. As such, communication between the main dimmer and one or more accessory devices may be performed during the communication time period $T_{COMM}$ using the active pull-up state and/or the active pull-down state. After the communication time period $T_{COMM}$, the accessory wiring may be in a high impedance state.

The accessory device may monitor for the beginning of a charge pulse during a charge pulse window $T_{CPW}$ right before the next zero-crossing 806. The charge pulse may occur during the charging time period $T_{CHRG}$ each line cycle. The charge pulse window $T_{CPW}$ may begin after a charge pulse window delay period $T_{DELAY}$, which may have a duration of approximately 14 milliseconds measured from the zero-crossing 802. The charge pulse window $T_{CPW}$ may begin at a time 805 before the zero-crossing 806 between the negative half cycle of the AC voltage waveform 800 and a subsequent cycle of the AC voltage waveform 800, for example, as shown in FIG. 8. During the charge pulse window $T_{CPW}$, the accessory devices may open their charge pulse detect window, which may be used by the accessory devices to stay in synchronization with the main dimmer. For example, the rising edge of the charge pulse during the charging time period $T_{CHRG}$ may be detected by the zero-cross detect circuit to establish the timing for the rest of the line cycle. The accessory wiring may be in the high impedance state during the charge pulse window $T_{CPW}$.

Although illustrated as comprising the charging time period $T_{CHRG}$ and the communication time period $T_{COMM}$ during the positive half cycle of the AC voltage waveform 800 but not the negative half cycle of the AC voltage waveform 800, in one or more embodiments, the AC voltage waveform 800 may include a charging time period $T_{CHRG}$ and a communication time period $T_{COMM}$ during the negative half cycle of the AC voltage waveform 800 but not the positive half cycle of the AC voltage waveform 800.

Figure 9:
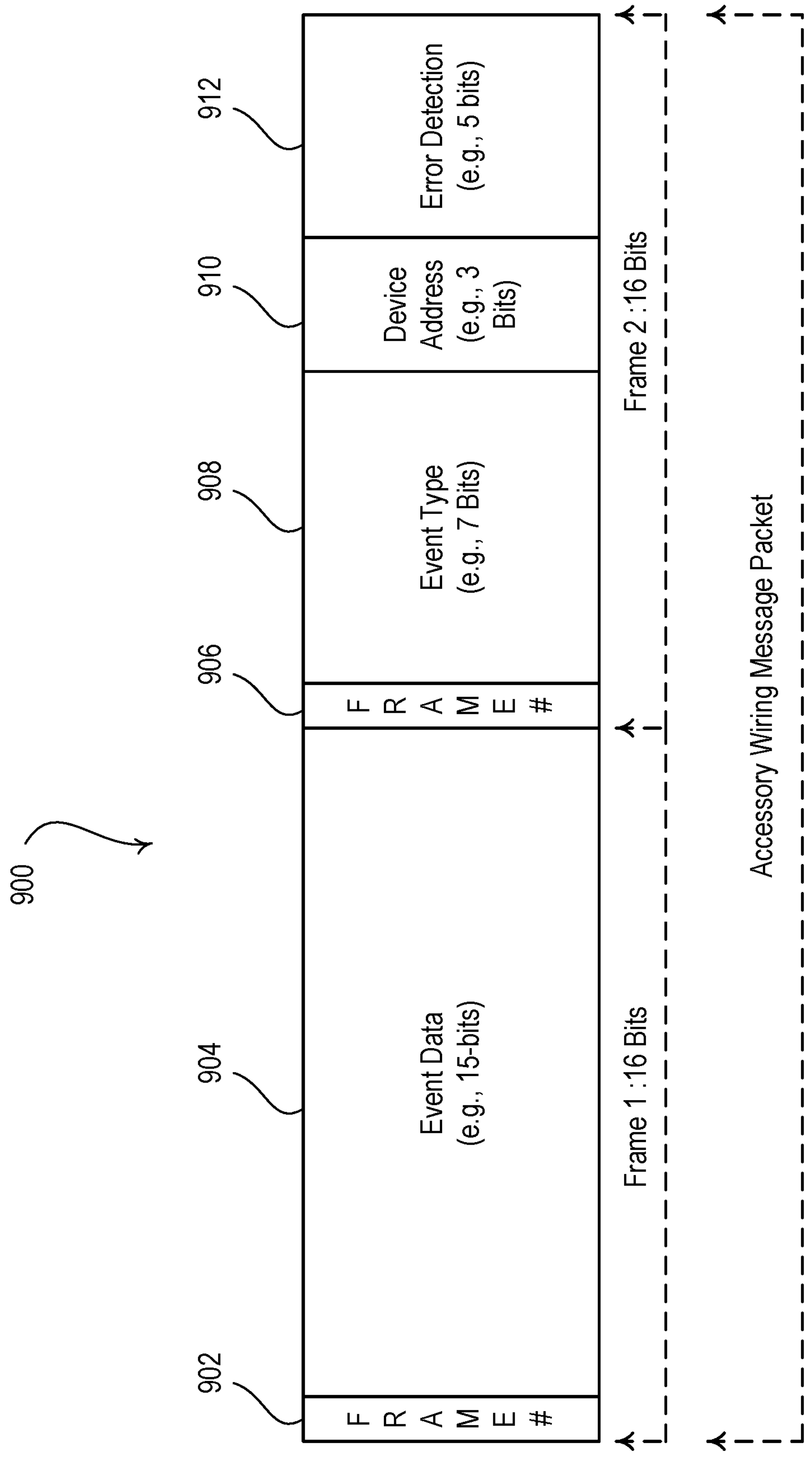
FIG. 9 is a diagram of an example of a payload format for communication between a main load control device and a remote load control device of a multiple location load control system.

FIG. 9 is a diagram of an example of a payload format for communication between a main load control device (e.g., the main dimmer 510) and an accessory device (e.g., one or both of the accessory devices 520, 520') of a multiple location load control system. A packet 900 may comprise two frames. The first frame may comprise a frame number 902 and event data 904. The second frame may comprise a frame number 906, event type 908, device address 910, and an error detection 912. The frame number field 902 and the frame number field 906 may identify which frame of the packet 900 is being sent. The frame number 902 and the frame number 906 may comprise one bit each. The event data 904 may comprise the data being communicated between the main dimmer and the remote dimmer. The event data 904 may comprise fifteen bits. The event type 908 may indicate the type of packet 900 communicated via the accessory wiring 509. For example, the event type 908 may encode the possible packet types that will be communication via the accessory wiring 509. The event type 908 may comprise seven bits. The device address 910 may identify the source device of the packet 900. The device address 910 may comprise three bits. The error detection field 912 may encode the forward error detection result to be used by the receiving device to validate the packet 900. For example, the error detection field 912 may comprise a multi-bit cyclic redundancy check (CRC) (e.g., a five bit CRC) that may be used by the receiving device to validate the packet 900.

Figure 10:
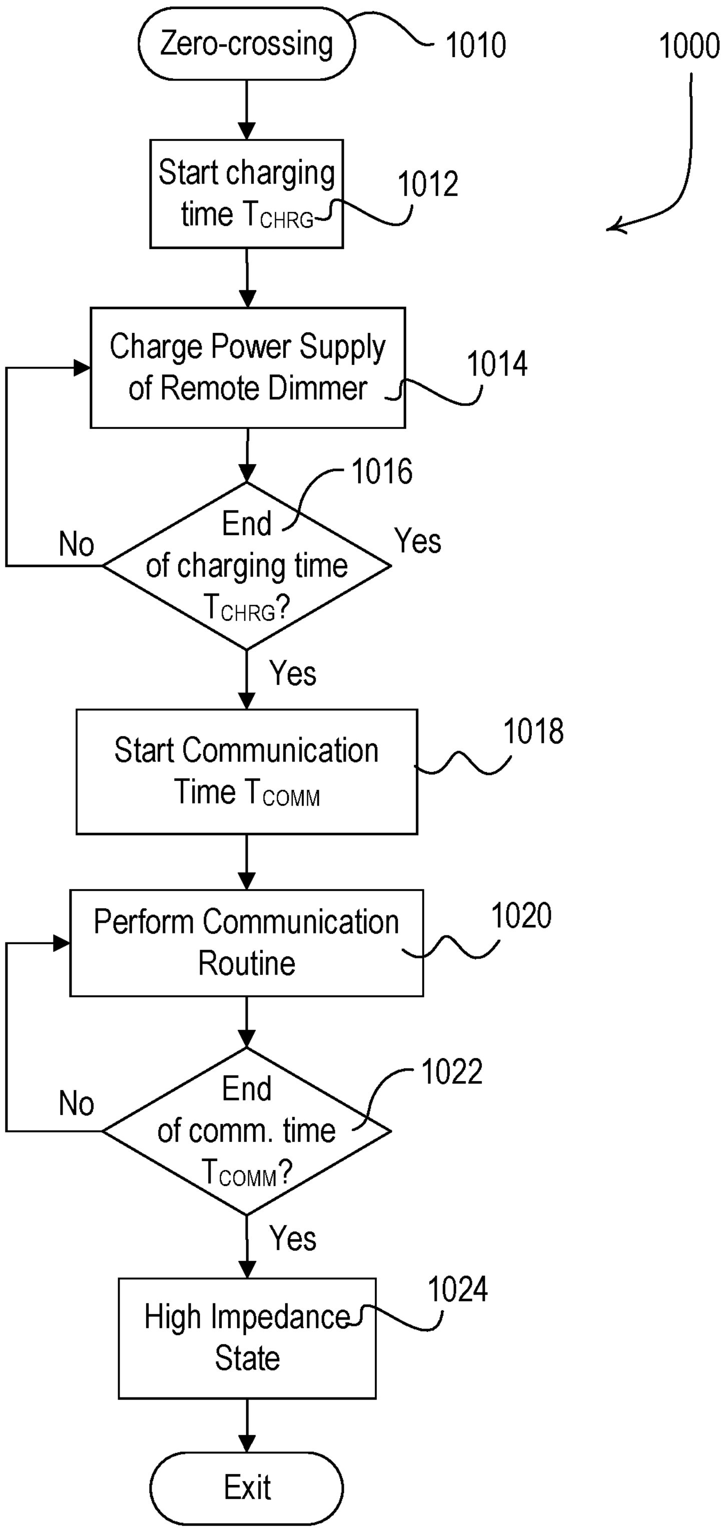
FIG. 10 is a flowchart of an example of a multi-location control procedure executed by a control circuit of a main load control device of a multiple location load control system.

FIG. 10 is a flowchart of an example of a multi-location control procedure 1000 executed by a control circuit of a main load control device of a multiple location load control system (e.g., the control circuit 614 of the main dimmer 510) for communicating with an accessory device via an accessory wiring. The multi-location control procedure 1000 may be executed periodically, e.g., once every line cycle. The procedure 1000 may begin at step 1010 when a zero-crossing detect circuit of the main load control device signals a zero-crossing to the control circuit 614 (e.g., at the beginning of the charging time $T_{CHRG}$ as shown in FIG. 8). Upon receiving the zero-crossing signal, the control circuit may start the charging time $T_{CHRG}$ at step 1012. During the charging time $T_{CHRG}$ at 1014, the main load control device may charge a power supply of the accessory device. At 1016, the control circuit may determine if the charging time $T_{CHRG}$ has ended. If not, then the control circuit may continue to charge the power supply of the accessory device. If the charging time $T_{CHRG}$ has ended, the control circuit may start a communication time $T_{COMM}$ at 1018.

During the communication time $T_{COMM}$, the control circuit may perform a communication routine at 1020. For example, the control circuit may transmit a digital message to the accessory device and/or receive a digital message from the accessory device via control of the accessory wiring by the sender (e.g., placing the accessory wiring in the active pull-up state and/or the active pull-down state). To communicate a "1" bit, the control circuit may place the accessory wiring in the active pull-up state. To communicate a "0" bit, the control circuit may place the accessory wiring in the active pull-down state. During the communication time $T_{COMM}$, the control circuit may be configured to receive a digital message from the accessory device when the control circuit is not presently transmitting a digital message. At 1022, the control circuit may determine if the communication time $T_{COMM}$ has ended. If not, the control circuit may continue to perform the communication routine. If the communication time $T_{COMM}$ has ended, the control circuit my place the accessory wiring in a high impedance state at 1024, for example, until the next charging time period $T_{CHRG}$.

Figure 11:
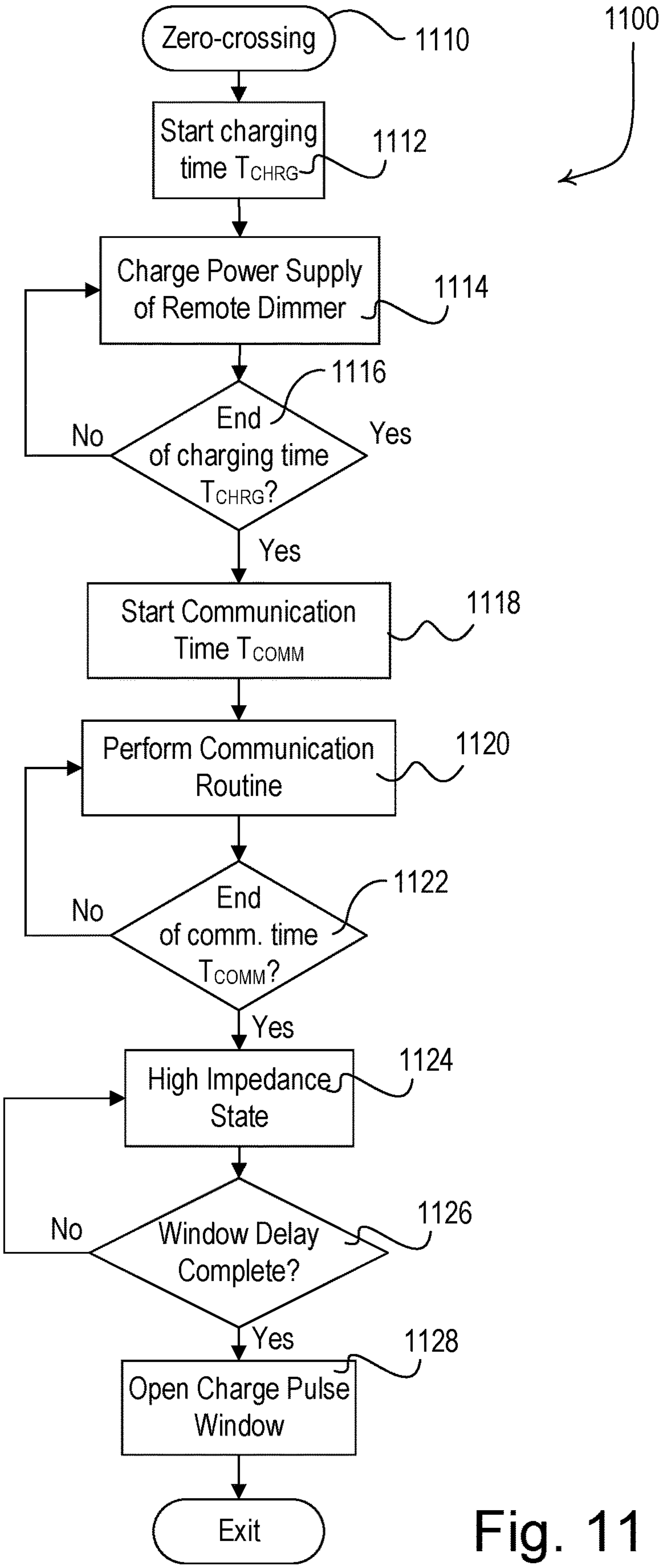
FIG. 11 is a flowchart of an example of a multi-location control procedure executed by a control circuit of an accessory device of a multiple location load control system.

FIG. 11 is a flowchart of an example of a multi-location control procedure 1100 executed by a control circuit of an accessory device of a multiple location load control system (e.g., the control circuit 714 of the accessory devices 520, 520') for communicating with a main load control device via an accessory wiring. The multi-location control procedure 1100 may be executed periodically, e.g., once every line cycle. The procedure 1100 may begin at step 1110 when a zero-crossing detect circuit of the accessory device signals a zero-crossing to the control circuit (e.g., at the beginning of the charging time $T_{CHRG}$ as shown in FIG. 8). Upon receiving the zero-crossing signal, the control circuit may start the charging time $T_{CHRG}$ at step 1112. During the charging time $T_{CHRG}$ at 1114, a power supply of the accessory device may be charged by the main load control device. At 1116, the control circuit may determine if the charging time $T_{CHRG}$ has ended. If not, the power supply of the accessory device may be charged. If the charging time $T_{CHRG}$ has ended, the control circuit may start a communication time $T_{COMM}$ at 1118.

During the communication time $T_{COMM}$, the control circuit may perform a communication routine at 1120. For example, the control circuit may transmit a digital message to the main load control device and/or receive a digital message from the main load control device via control of the accessory wiring by the sender (e.g., placing the accessory wiring in the active pull-up state and/or the active pull-down state). To communicate a "1" bit, the control circuit may place the accessory wiring in the active pull-up state. To communicate a "0" bit, the control circuit may place the accessory wiring in the active pull-down state. During the communication time $T_{COMM}$, the control circuit may be configured to receive a digital message from the main load control device when the control circuit is not presently transmitting a digital message. At 1122, the control circuit may determine if the communication time $T_{COMM}$ has ended. If not, the control circuit may continue to perform the communication routine. If the communication time $T_{COMM}$ has ended, the control circuit my place the accessory wiring in a high impedance state at 1124, for example, until the next charging time period $T_{CHRG}$.

At 1126, the control circuit may determine if the window delay period $T_{DELAY}$ is complete. If the delay period $T_{DELAY}$ is Complete, then the control circuit may open the charge pulse window $T_{CPW}$ at 1128. During the charge pulse window $T_{CPW}$, the control circuit 714 may monitor for a charge pulse that may occur during a subsequent charging time period $T_{CHRG}$ during a subsequent line cycle. The detection of the charge pulse during the charge pulse window $T_{CPW}$ may be used by the control circuit to stay in synchronization with the main load control device. For example, the rising edge of the charge pulse during the charging time period $T_{CHRG}$ may be detected by the zero-cross detect circuit to establish the timing for the rest of the line cycle. As such, the control circuit may start a subsequent charging time $T_{CHRG}$, e.g., return to 1112, upon detecting the charge pulse.

Figure 12:
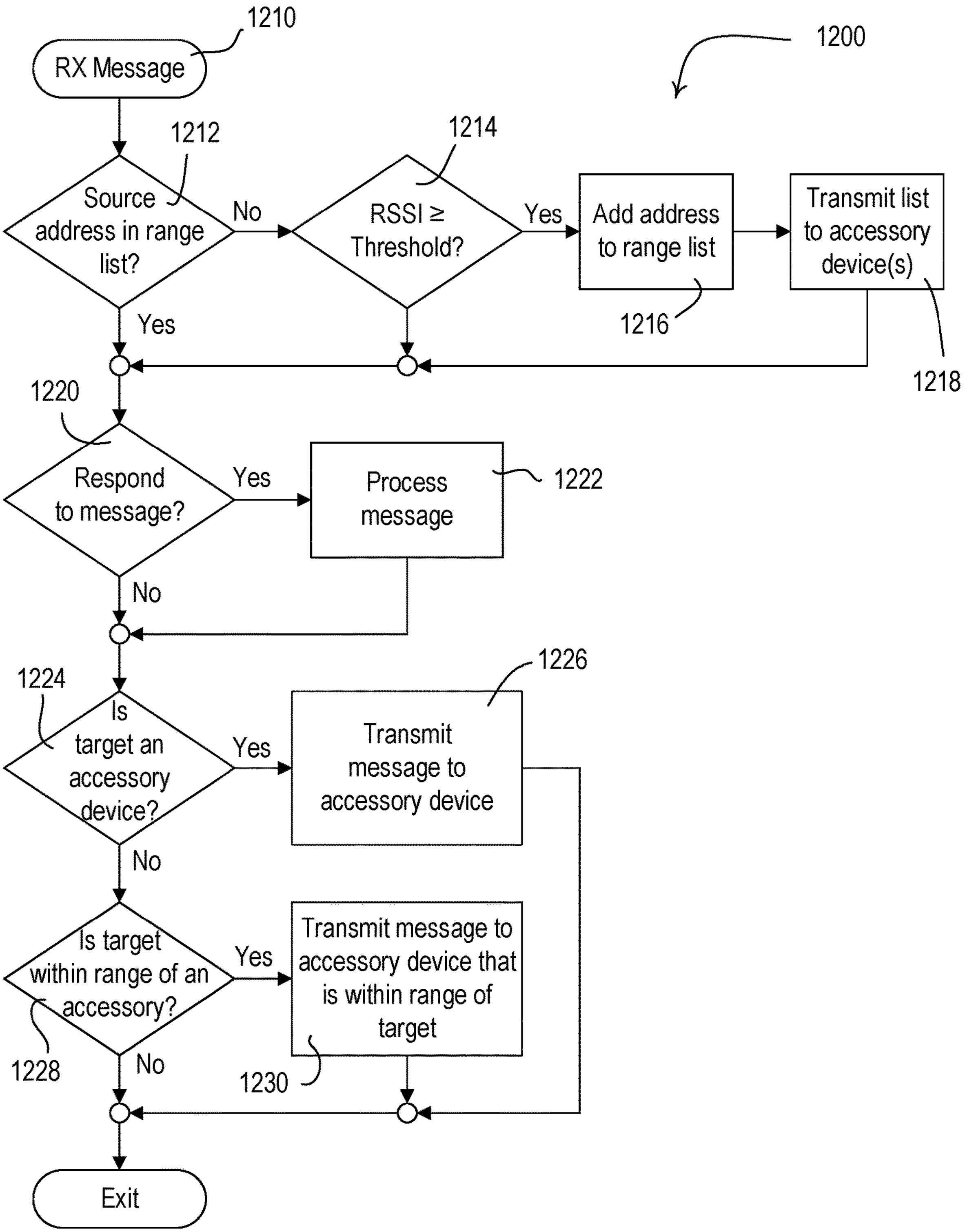
FIG. 12 is a flowchart of an example of a communication procedure (e.g., a wireless communication procedure) that may be executed by a control circuit of a control device of a multiple location load control system in response to a message from an external device via a communication circuit (e.g., a wireless communication circuit).

FIG. 12 is a flowchart of an example of a communication procedure 1200 (e.g., a wireless communication procedure) that may be executed by a control circuit of a control device of a multiple location load control system (e.g., the control circuit 614 of the main dimmer 510 and/or the control circuit 714 of the accessory devices 520, 520'). For example, the control circuit may execute the communication procedure 1200 in response to receiving at 1210 a message (e.g., a digital message) from an external device (e.g., the second dimmer 560 and/or the wireless remote control device 580) via a communication circuit, such as a wireless communication circuit (e.g., the communication circuit 625 of the main dimmer 510 and/or the communication circuit of the accessory devices 520, 520'). The control circuit may also be configured to transmit digital messages to external devices via the communication circuit and/or via a multi-location circuit (e.g., to external devices coupled to the control device via an accessory wiring).

At 1212, the control circuit may determine if the source address of the received message is in a range list of the control device. If the source address of the received message is not in the range list of the control device at 1212 and the received signal strength (RSSI) of the received message is greater than or equal to a threshold that may define a wireless range of the control device (e.g., 10 to −60 dBm) at 1214, the control circuit may add the source address to the range list at 1216 and transmit the range list to external devices via the multi-location circuit at 1218. If the source address of the received message is in the range list of the control device at 1212 and/or the received signal strength of the received message is less than the threshold at 1214, the control circuit may not add the source address to the range list.

At 1220, the control circuit may determine if the control circuit should respond to (e.g., process) the received message. For example, the control circuit may determine if the source address of the received message identifies the device address or accessory address of the control device at 1220. If the control circuit should respond to the received message at 1220, the control circuit may process the received message at 1222. For example, the control circuit may control an electrical load at 1222, e.g., by controlling the controllably conductive device 610 in response to a command included in the received digital message. In addition, the control circuit may provide feedback at 1222, e.g., by controlling the visual indicators 516, 544 to provide visible feedback of the amount of power presently being delivered to the electrical load. Further, the control circuit may store data in memory at 1222, e.g., to store the addresses or accessory addresses of the control device to which the control circuit is associated.

At 1224, the control circuit may determine if the target address of the received message is the device address or accessory address of one of the external devices coupled to the control circuit via the multi-location circuit. If so, the control circuit may transmit the received message (e.g., a command and/or data included in the received message) to the external device via the multi-location circuit at 1226. At 1228, the control circuit may determine if the target address of the received message is within wireless range of one of the external devices coupled to the control circuit via the multi-location circuit. For example, at 1228, the control circuit may determine if the target address is included in range lists for one or more of the external devices that may be stored in memory. If the target address is within wireless range of one of the external devices at 1228, the control circuit may transmit the received message (e.g., a command and/or data included in the received message) to the external device via the multi-location circuit at 1230, before the communication procedure 1200 exits.

Figure 13:
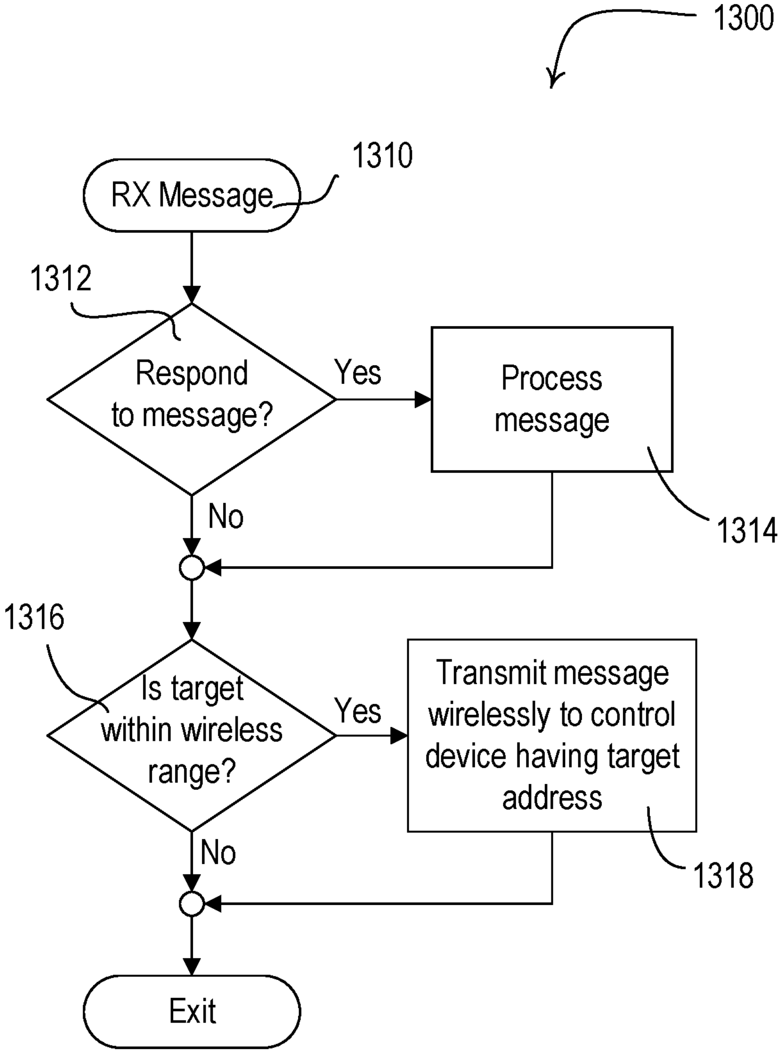
FIG. 13 is a flowchart of an example of a communication procedure (e.g., multi-location communication procedure) that may be executed by a control circuit of a control device of a multiple location load control system in response to receiving via a multi-location circuit a message transmitted on an accessory wiring by an external device.

FIG. 13 is a flowchart of another example of a communication procedure 1300 (e.g., a multi-location communication procedure) that may be executed by a control circuit of a control device of a multiple location load control system (e.g., the control circuit 614 of the main dimmer 510 and/or the control circuit 714 of the accessory devices 520, 520'). For example, the control circuit may execute the communication procedure 1300 in response to receiving at 1310 a message (e.g., a digital message) from an external device (e.g., the main dimmer 510 and/or the accessory devices 520, 520') via a multi-location circuit (e.g., the multi-location circuit 632 and/or the multi-location circuit 732) via an accessory wiring. The control circuit may also be configured to transmit digital messages to external devices via the multi-location circuit and/or via a communication circuit, such as a wireless communication circuit (e.g., the communication circuit 625 of the main dimmer 510 and/or the communication circuit of the accessory devices 520, 520').

At 1312, the control circuit may determine if the control circuit should respond to (e.g., process) the received message. For example, the control circuit may determine if the source address of the received message identifies the device address or accessory address of the control device at 1312. If the control circuit should respond to the received message at 1312, the control circuit may process the received message at 1314. For example, the control circuit may control an electrical load at 1314, e.g., by controlling the controllably conductive device 610 in response to a command included in the received digital message. In addition, the control circuit may provide feedback at 1314, e.g., by controlling the visual indicators 516, 544 to provide visible feedback of the amount of power presently being delivered to the electrical load. Further, the control circuit may store data in memory at 1314, e.g., to store a range list of device addresses that are within wireless range of another control device.

At 1316, the control circuit may determine if the target address of the received message is within wireless range of the control device. For example, at 1316, the control circuit may determine if the target address is included in a range list of device addresses of external control devices within wireless range of the control device that may be stored in memory. If the target address is within wireless range of the control device at 1316, the control circuit may transmit the received message (e.g., a command and/or data included in the received message) to the external control device having the target address via the wireless communication circuit at 1318, before the communication procedure 1300 exits.

Although described with reference to a main dimmer (e.g., the main dimmer 510) and accessory devices (e.g., the accessory devices 520, 520'), one or more embodiments described herein may be used with other load control devices. For example, one or more of the embodiments described herein may be performed by a variety of load control devices that are configured to control of a variety of electrical load types, such as, for example, a LED driver for driving an LED light source (e.g., an LED light engine); a screw-in luminaire including a dimmer circuit and an incandescent or halogen lamp; a screw-in luminaire including a ballast and a compact fluorescent lamp; a screw-in luminaire including an LED driver and an LED light source; a dimming circuit for controlling the intensity of an incandescent lamp, a halogen lamp, an electronic low-voltage lighting load, a magnetic low-voltage lighting load, or another type of lighting load; an electronic switch, controllable circuit breaker, or other switching device for turning electrical loads or appliances on and off; a plug-in load control device, controllable electrical receptacle, or controllable power strip for controlling one or more plug-in electrical loads (e.g., coffee pots, space heaters, other home appliances, and the like); a motor control unit for controlling a motor load (e.g., a ceiling fan or an exhaust fan); a drive unit for controlling a motorized window treatment or a projection screen; motorized interior or exterior shutters; a thermostat for a heating and/or cooling system; a temperature control device for controlling a heating, ventilation, and air conditioning (HVAC) system; an air conditioner; a compressor; an electric baseboard heater controller; a controllable damper; a humidity control unit; a dehumidifier; a water heater; a pool pump; a refrigerator; a freezer; a television or computer monitor; a power supply; an audio system or amplifier; a generator; an electric charger, such as an electric vehicle charger; and an alternative energy controller (e.g., a solar, wind, or thermal energy controller).

What is claimed is:

1. A load control system for controlling power delivered from an alternating-current power source to a plurality of electrical loads including a first electrical load and a second electrical load, the load control system comprising:

a first load control device comprising a first main terminal, a second main terminal, and an accessory terminal, the first load control device adapted to be electrically coupled in series between the AC power source and the first electrical load for control of the power delivered to the first electrical load, the first load control device configured to conduct a load current from the AC power source to the first electrical load via the first and second main terminals;

an accessory device adapted to be coupled between the first main terminal and the accessory terminal of the first load control device or between the second main terminal and the accessory terminal of the first load control device;

a second load control device adapted to be electrically coupled in series between the AC power source and the second electrical load for control of the power delivered to the second electrical load; and a remote control device configured to wirelessly transmit a first digital message including a command for controlling the second electrical load to the first load control device;

wherein, in response to receiving the first digital message, the first load control device is configured to transmit a second digital message including the command for controlling the second electrical load to the accessory device via the accessory wiring, the accessory device further configured to wirelessly transmit a third digital message including the command for controlling the second electrical load to the second load control device.

2. The load control system of claim 1, wherein the first load control device is configured to store a list of device addresses that are within wireless range of the accessory device.

3. The load control system of claim 2, wherein, after receiving the first digital message including the command for controlling the second electrical load, the first load control device is configured to determine that a unique device address of the second load control device is included in the list of device addresses that are within range of the accessory device before transmitting the second digital message including the command for controlling the second electrical load to the accessory device via the accessory wiring.

4. The load control system of claim 3, wherein the accessory device is configured to wirelessly receive a fourth digital message from the second load control device, and, if a signal strength of the fourth digital message exceeds a threshold, store a device address of the second load control device in the list of device addresses that are within wireless range of the accessory device.

5. The load control system of claim 4, wherein the accessory device is configured to transmit the list of device addresses that are within wireless range of the accessory device to the first load control device via the accessory wiring.

6. The load control system of claim 1, wherein the accessory device is configured to be assigned a unique device address and to transmit and receive digital messages via the accessory wiring using the device address, the second load control device configured to be associated with the accessory device and to store the device address of the accessory device.

7. The load control system of claim 6, wherein the second load control device is configured to include the device address of the accessory device in the first digital message transmitted to the first load control device, and the first load control device is configured to include the device address of the accessory device in the second digital message transmitted to the accessory device via the accessory wiring.

8. The load control system of claim 1, wherein the main load control device is configured to assign the accessory device a unique accessory address, the accessory device configured to transmit and receive digital messages via the accessory wiring using the accessory address, the first load control device configured to include the accessory address in the second digital message transmitted to the accessory device via the accessory wiring.

9. The load control system of claim 8, wherein the accessory device is configured to be assigned a unique device address, the second load control device configured to be associated with the accessory device and to store the device address of the accessory device, the accessory device configured to include the device address of the accessory device in the third digital message wirelessly transmitted to the second load control device.

10. The load control system of claim 1, wherein the accessory device is configured to transmit a fourth digital message including a command for controlling the first electrical load to the first load control device via the accessory wiring.

11. A main load control device for use in a load control system for controlling power delivered from an alternating-current power source to a plurality of electrical loads, the plurality of electrical loads including a first electrical load and a second electrical load, the load control system including an accessory device adapted to be coupled to the main load control device via an electrical wire and a second load control device adapted to control the power delivered to the second electrical load, the main load control device comprising:

a controllably conductive device adapted to be electrically coupled in series between the AC power source and the first electrical load;

a control circuit configured to control the controllably conductive device to control the power delivered to the first electrical load;

a first communication circuit adapted to be coupled to the electrical wire, the communication circuit configured to transmit digital messages to and receive digital messages from the accessory device via the electrical wire; and a second communication circuit adapted to wirelessly transmit digital messages to and receive digital messages;

wherein the control circuit is configured to receive a first digital message including a command for controlling the second electrical load via the second communication circuit, the control circuit further configured to subsequently transmit a second digital message including the command for controlling the second electrical load to the first load control device via the first communication circuit.

12. The main load control device of claim 11, further comprising:

a memory configured to store a first list of device addresses that are within wireless range of the accessory device.

13. The main load control device of claim 12, wherein, after receiving the first digital message including the command for controlling the second electrical load via the second communication circuit, the control circuit is configured to determine that a unique device address of the second load control device is included in the first list of device addresses that are within range of the accessory device before transmitting the second digital message including the command for controlling the second electrical load to the accessory device via the first communication circuit.

14. The main load control device of claim 13, wherein the control circuit is configured to receive the first list of device addresses that are within wireless range of the accessory device from the accessory device via the first communication link.

15. The main load control device of claim 12, wherein the control circuit is configured to wirelessly receive a third digital message via the second communication circuit, and, if a signal strength of the fourth digital message exceeds a threshold, store in the memory a source address of the fourth digital message in a second list of device addresses that are within wireless range of the main load control device.

16. The main load control device of claim 15, wherein the control circuit is configured to transmit the second list of device addresses that are within wireless range of the main load control device to the accessory device via the accessory wiring.

17. The main load control device of claim 11, wherein the main load control device is configured to assign the accessory device a unique accessory address.

18. The main load control device of claim 17, wherein the control circuit is configured to include the accessory address of the accessory device in the second digital message transmitted to the accessory device via the accessory wiring.

19. The main load control device of claim 11, wherein the control circuit is configured to receive a third digital message including a command for controlling the first electrical load from the accessory device via the first communication circuit.

* * * * *